United States Patent
Cho et al.

(10) Patent No.: US 10,565,405 B2
(45) Date of Patent: *Feb. 18, 2020

(54) SMART CARD DEVICE, SYSTEM INCLUDING THE SAME AND METHOD OF OPERATING SMART CARD SYSTEM

(71) Applicant: SAMSUNG ELECTRONICS CO., LTD., Suwon-si, Gyeonggi-do (KR)

(72) Inventors: Hyuck-Jun Cho, Hwaseong-si (KR); Donald Na, Hwasung (KR); Seung-Hwan Baek, Anyang-si (KR); Jae-Keun Oh, Seoul (KR); Kee-Moon Chun, Seongnam-si (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 63 days.

This patent is subject to a terminal disclaimer.

(21) Appl. No.: 15/432,601

(22) Filed: Feb. 14, 2017

(65) Prior Publication Data
US 2017/0169256 A1  Jun. 15, 2017

Related U.S. Application Data

(63) Continuation of application No. 14/819,565, filed on Aug. 6, 2015, now Pat. No. 9,589,221.

(30) Foreign Application Priority Data

Sep. 15, 2014 (KR) .......................... 10-2014-0121610

(51) Int. Cl.
*G06F 1/26* (2006.01)
*G06F 1/32* (2019.01)
(Continued)

(52) U.S. Cl.
CPC ............. *G06K 7/0021* (2013.01); *G06F 1/00* (2013.01); *G06F 1/06* (2013.01); *G06F 1/3287* (2013.01);
(Continued)

(58) Field of Classification Search
CPC .. G06K 19/07; G06K 7/0021; G06K 19/0701; G06K 19/0715; G06F 1/00;
(Continued)

(56) References Cited

U.S. PATENT DOCUMENTS 5,274,221 A  12/1993 Matsubara
6,775,784 B1 * 8/2004 Park ...................... G06F 1/3203
  713/320

(Continued)

FOREIGN PATENT DOCUMENTS

JP  2007-199895 A  8/2007
JP  2008-129836 A  6/2008
(Continued)

*Primary Examiner* — Zhipeng Wang
(74) *Attorney, Agent, or Firm* — Lee & Morse, P.C.

(57) ABSTRACT

A smart card may include data storage and transmission circuitry, a plurality of voltage controllers to supply operational power to card circuitry, a plurality of oscillators to supply an internal clock for the card, and power management circuitry. The power management circuitry may be configured to shut down the oscillators and at least one, but not all, voltage controllers during a period after a data transmission is completed.

20 Claims, 25 Drawing Sheets

(51) Int. Cl.
| | | |
|---|---|---|
| *G06K 7/00* | (2006.01) | |
| *G06Q 20/34* | (2012.01) | |
| *G06F 1/06* | (2006.01) | |
| *G06K 19/07* | (2006.01) | |
| *G06F 1/3287* | (2019.01) | |
| *G06F 1/00* | (2006.01) | |

(52) U.S. Cl.
CPC ......... *G06K 19/07* (2013.01); *G06K 19/0701* (2013.01); *G06K 19/0715* (2013.01); *G06Q 20/341* (2013.01)

(58) Field of Classification Search
CPC ....... G06F 1/06; G06F 1/3287; G06Q 20/341; Y02D 10/171; Y02D 50/20
See application file for complete search history.

(56) References Cited

U.S. PATENT DOCUMENTS

| | | | |
|---|---|---|---|
| 6,978,335 B2 | 12/2005 | Lee | |
| RE39,837 E * | 9/2007 | Marisetty | G06F 1/3203 713/324 |
| 7,809,961 B2 * | 10/2010 | Dahan | G06F 1/3228 713/300 |
| 8,346,306 B2 | 1/2013 | Kawakishi et al. | |
| 8,499,180 B2 | 7/2013 | Varone et al. | |
| 9,589,221 B2 * | 3/2017 | Cho | G06F 1/00 |
| 2006/0043202 A1 * | 3/2006 | Kim | G06K 19/0723 235/492 |
| 2006/0085655 A1 * | 4/2006 | Sung | G06K 19/0707 713/300 |
| 2009/0153236 A1 | 6/2009 | Kneepkens et al. | |
| 2009/0158071 A1 * | 6/2009 | Ooi | G06F 1/26 713/340 |
| 2009/0177422 A1 * | 7/2009 | Cox | G06F 1/3203 702/64 |
| 2009/0177907 A1 * | 7/2009 | Sotomayor, Jr. | G06F 1/3203 713/340 |
| 2011/0138203 A1 * | 6/2011 | Chang | G06F 1/3253 713/320 |
| 2013/0039241 A1 | 2/2013 | Ruvalcaba et al. | |
| 2013/0334320 A1 | 12/2013 | Thill et al. | |
| 2015/0026495 A1 * | 1/2015 | Jain | G06F 1/32 713/323 |

FOREIGN PATENT DOCUMENTS

| | | |
|---|---|---|
| KR | 2004-0050748 A | 6/2004 |
| KR | 2006-0080388 A | 7/2006 |

\* cited by examiner

FIG. 8

|  | ON/OFF |
|---|---|
| ACTIVE VOLTAGE CONTROLLERS | SEQUENTIALLY OFF |
| OSCILLATORS | SEQUENTIALLY OFF |
| STOP VOLTAGE CONTROLLERS | ON |

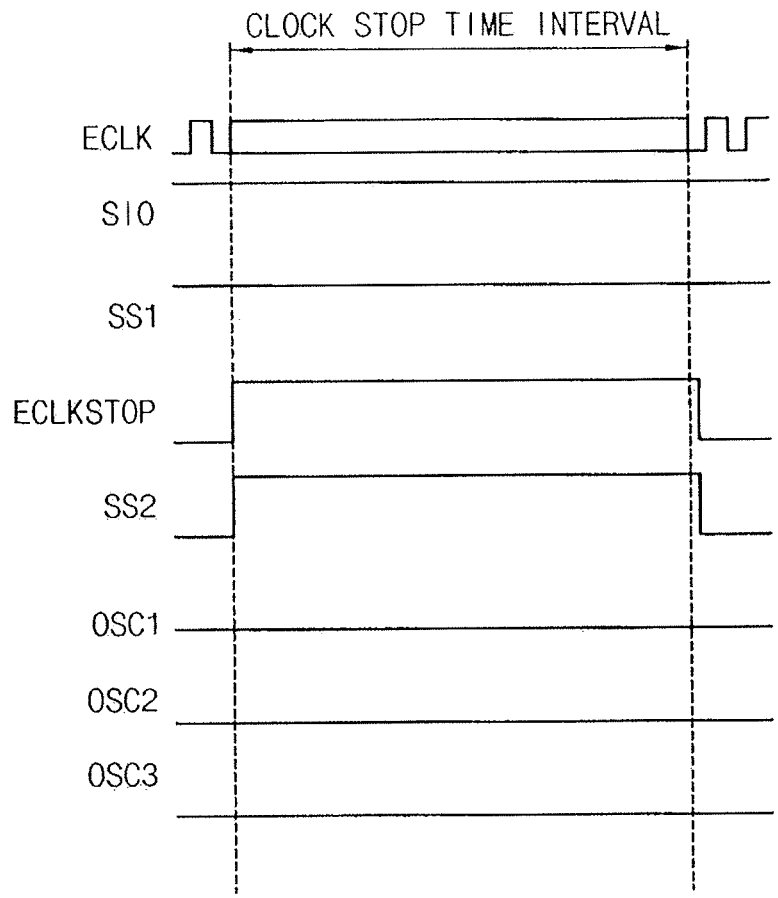

FIG. 15

| | ON/OFF |
|---|---|
| ACTIVE VOLTAGE CONTROLLERS | SEQUENTIALLY ON |
| OSCILLATORS | SEQUENTIALLY ON |
| STOP VOLTAGE CONTROLLERS | ON |

FIG. 17

|  | Class A<br>(4.5 ~ 5.5v) | Class B<br>(2.7 ~ 3.3v) | Class C<br>(1.62 ~ 1.98v) |
|---|---|---|---|
| IDLE STATE | < 200uA | < 200uA | < 200uA |
| CLOCK STOP MODE | < 200uA | < 100uA | < 100uA |

SMART CARD DEVICE, SYSTEM INCLUDING THE SAME AND METHOD OF OPERATING SMART CARD SYSTEM

CROSS-REFERENCE TO RELATED APPLICATION

This application is a continuation based on pending application Ser. No. 14/819,565, filed Aug. 6, 2015 the entire contents of which is hereby incorporated by reference.

This application claims priority under 35 USC § 119 to Korean Patent Applications No. 10-2014-0121610, filed on Sep. 15, 2014, in the Korean Intellectual Property Office (KIPO), the contents of which are herein incorporated by reference in their entirety.

BACKGROUND

1. Technical Field

Exemplary embodiments relate generally to a smart card and more particularly to a method of operating a smart card and a method of operating a smart card system.

2. Description of the Related Art

A smart card may perform functions using, for example, a micro-processor and an operating system included in the smart card. Researches is in progress to decrease power consumption of a smart card.

SUMMARY

Some exemplary embodiments provide a method of operating a smart card capable of decreasing power consumption by controlling voltages that are provided to sub-units, based on a control signal and level control signals during a clock stop time interval.

In a method of operating a smart card according to exemplary embodiments, a power management unit deactivates a plurality of sub-units based on a plurality of enable signals during a first idle time interval. A first stop signal is a second logic level and a second stop signal is a first logic level based on a external clock signal during the first idle time interval after data transmission is completed. The power management unit and a frequency detector control voltages based on a control signal and level control signals during a clock stop time interval. The voltages are provided to the sub-units. The control signal is generated from the frequency detector. The level control signals are generated from the power management unit based on the control signal. The first stop signal is the second logic level and the second stop signal is the second logic level based on the external clock signal during the clock stop time interval after the first idle time interval. The power management unit activates the plurality of sub-units based on the plurality of enable signals during a second idle time interval. The first stop signal is the second logic level and the second stop signal is the first logic level based on the external clock signal during the second idle time interval after the clock stop time interval.

The plurality of sub-units may include an internal voltage control unit and an oscillator unit. The internal voltage control unit may include a plurality of active voltage controllers and a plurality of stop voltage controllers. The oscillator unit may include a plurality of oscillators. The plurality of active voltage controllers, the plurality of stop voltage controllers and the plurality of oscillators may be activated and deactivated based on the plurality of enable signals.

The external clock signal may be activated during the first idle time interval. During the first idle time interval, the plurality of oscillators may be sequentially turned-off based on oscillator enable signals of the plurality of enable signals.

During the first idle time interval, the plurality of stop voltage controllers may be turned-on based on stop voltage controller enable signals of the plurality of enable signals. The plurality of active voltage controllers may be sequentially turned-off based on active voltage controller enable signals of the plurality of enable signals.

The external clock signal may be deactivated during the clock stop time interval. During the clock stop time interval, the frequency detector may stop detecting whether a frequency of the external clock signal is in a predetermined range and may detect whether the external clock signal is activated or not. The frequency detector and the power management unit may control the voltages based on stop voltage control signals of the level control signals and the control signal during the clock stop time interval. The voltages may be provided to the stop voltage controllers. The level control signals may be generated from the power management unit based on the control signal.

The stop voltage controllers may include a first stop voltage controller and a second stop voltage controller. A level of a first stop voltage that is provided from the first stop voltage controller may be different from a level of a second stop voltage that is provided from the second stop voltage controller.

The first stop voltage that is provided from the first stop voltage controller may be provided to a logic circuit unit included in the smart card. The second stop voltage that is provided from the second stop voltage controller may be provided to SRAM included in the smart card.

During the clock stop time interval, the plurality of oscillators may be turned-off. During the clock stop time interval, the stop voltage controllers may be turned-on and the active voltage controllers may be turned-off.

The external clock signal may be activated during the second idle time interval. During the second idle time interval, the plurality of oscillators may be sequentially turned-on based on oscillator enable signals of the plurality of enable signals.

During the second idle time interval, the stop voltage controllers may be turned-on based on stop voltage controller enable signals. During the second idle time interval, the plurality of active voltage controllers may be sequentially turned-on based on active voltage controller enable signals of the plurality of enable signals.

The plurality of sub-units may further include a detector unit. The detector unit may include a plurality of detectors that detect internal environment of the smart card. The plurality of detectors may be activated and deactivated based on the plurality of enable signals.

During the first idle time interval, the plurality of detectors may be sequentially turned-off based on detector enable signals of the plurality of enable signals. During the clock stop time interval, the plurality of detectors may be turned-off. During the second idle time interval, the plurality of detectors may be sequentially turned-on based on the detector enable signals.

The plurality of sub-units may further include a reset unit. The reset unit may reset the smart card in the event internal voltage of the smart card is less than a predetermined voltage. During the clock stop time interval, the reset unit may be turned-off based on a reset enable signal of the plurality of enable signals.

The plurality of sub-units may further include a pad unit that receives external signals. During the clock stop time interval, the pad unit may be turned-on and turned-off based on a pad enable signal of the plurality of enable signals.

In a method of operating a smart card according to exemplary embodiments, a power management unit deactivates a plurality of sub-units based on a plurality of enable signals during a first stop time interval. A first stop signal is a second logic level and a second stop signal is a first logic level based on the first stop signal during the first stop time interval after data transmission is completed. The power management unit and a frequency detector control voltages based on a control signal and level control signals during a second stop time interval after the first stop time interval. The voltages are provided to the sub-units. The control signal is generated from the frequency detector. The level control signals are generated from the power management unit based on the control signal. The power management unit activates the plurality of sub-units based on the plurality of enable signals during a third stop time interval. The third stop time interval is before the first stop signal transitions from the second logic level to the first logic level after the second stop time interval.

A method of operating a smart card according to exemplary embodiments may decrease power consumption by controlling voltages that are provided to sub-units, based on a control signal and level control signals during a clock stop time interval.

In exemplary embodiments in accordance with principles of inventive concepts a smart card includes data storage and transmission circuitry; a plurality of voltage controllers to supply operational power to card circuitry; a plurality of oscillators to supply an internal clock for the card; and power management circuitry to shut down the oscillators and at least one, but not all, voltage controllers during a period after a data transmission is completed.

In exemplary embodiments in accordance with principles of inventive concepts a smart card includes power management circuitry configured to reduce the voltage output of a voltage controller that has not been shut down when an external clock is deactivated.

In exemplary embodiments in accordance with principles of inventive concepts a smart card includes power management circuitry configured to turn on the oscillators and voltage controllers that had been shut down and to return the output voltage of a voltage controller whose output voltage had been reduced when the external clock is activated.

In exemplary embodiments in accordance with principles of inventive concepts a smart card includes power management circuitry configured to shut down the oscillators in sequence.

In exemplary embodiments in accordance with principles of inventive concepts a smart card includes power management circuitry shuts down a plurality of voltage controllers in sequence.

BRIEF DESCRIPTION OF THE DRAWINGS

Illustrative, non-limiting exemplary embodiments will be more clearly understood from the following detailed description taken in conjunction with the accompanying drawings.

FIG. 8 is a timing diagram for describing states of an oscillator unit and an internal voltage control unit included in the smart card of FIG. 3 during a first idle time interval.

FIG. 11 is a timing diagram for describing an operation of an oscillator unit included in the smart card of FIG. 3 during a clock stop time interval.

FIG. 12 is a timing diagram for describing states of an oscillator unit and an internal voltage control unit included in the smart card of FIG. 3 during a clock stop time interval.

FIG. 15 is a timing diagram for describing states of an oscillator unit and an internal voltage control unit included in the smart card of FIG. 3 during a second idle time interval.

FIG. 17 is a diagram illustrating a current specification according to ETSI TS 102 221 that is a specification of a smart card.

DETAILED DESCRIPTION

Figure 1:
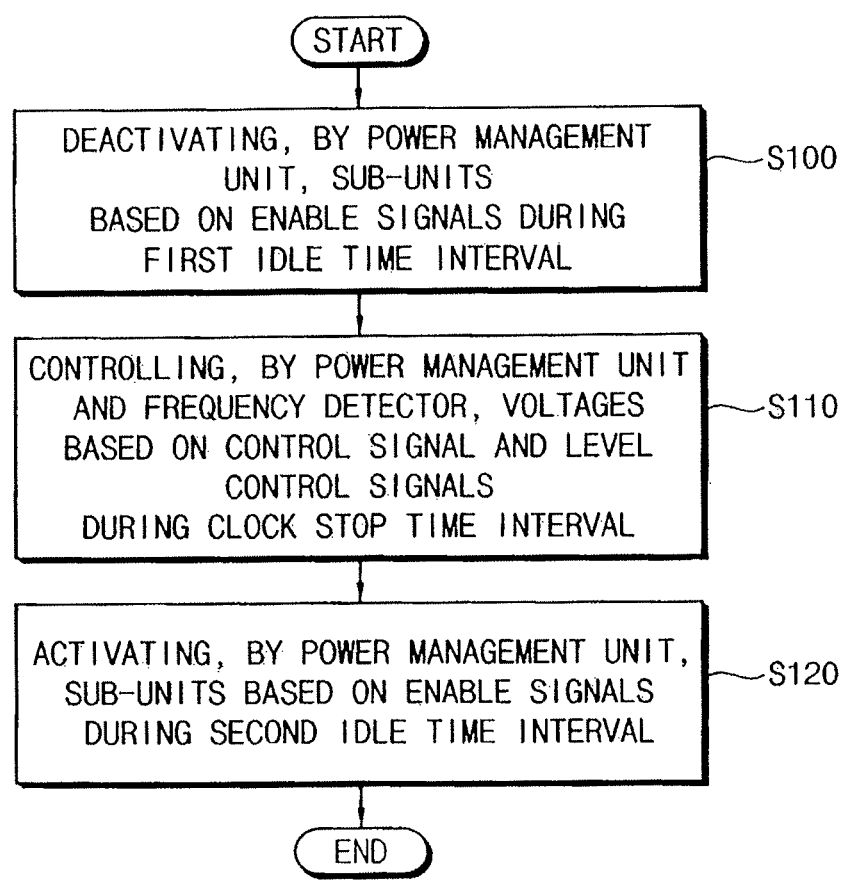
FIG. 1 is a flow chart illustrating a method of operating a smart card according to exemplary embodiments.

Various exemplary embodiments will be described more fully hereinafter with reference to the accompanying drawings, in which some exemplary embodiments are shown. Inventive concepts may, however, be embodied in many different forms and should not be construed as limited to the exemplary embodiments set forth herein. Rather, these exemplary embodiments are provided so that this disclosure will be thorough and complete, and will fully convey the scope of inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These tell is are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific teens) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and shall not be interpreted in an idealized or overly formal sense unless expressly so defined herein.

A smart card in accordance with principles of inventive concepts may include a plurality of voltage controllers and oscillators which it operates to conserve power during intervals between data transmissions that occur between the smart card and a card reader. At least one voltage controller may be of a first, "active," operational type and at least one may be of a second, "stop," operational type. Active operational types operate at nominal voltages during card operations such as data transmission, but are turned off during idle periods (thereby cutting off power to circuits to which they supply power); stop operational types continue to operate during idle periods, but may operate at reduced voltage levels during some idle periods (thereby reducing power supplied to circuits during the low-voltage periods).

Relatively inactive smart card periods between data transmission may be broken down into: a first idle period (also referred to herein as idle time interval 1), which may occur during the time after a data transmission has been completed and the time that an external clock stops oscillating; a second idle period (also referred to herein as a clock stop interval) may occur during the time from the stopping of the external clock until the external clock begins to oscillate again; and a third idle period (also referred to herein as idle time interval 2) may occur from the time the external clock resumes oscillation until another data transmission is initiated.

In exemplary embodiments, during the first idle period the oscillators are shut down (sequentially, if more than one) and the one or more active voltage controllers are shut down (sequentially, if more than one). During the second idle period the oscillators and active voltage controllers remain "off" and the stop voltage controllers are operated at a reduced voltage level. During the third idle period the oscillators are restarted, (in a reverse sequence, for example), active voltage controllers are restarted (in a reverse sequence, for example), and stop voltage controllers return to nominal voltage level operation from their reduced voltage level operation.

Figure 2:
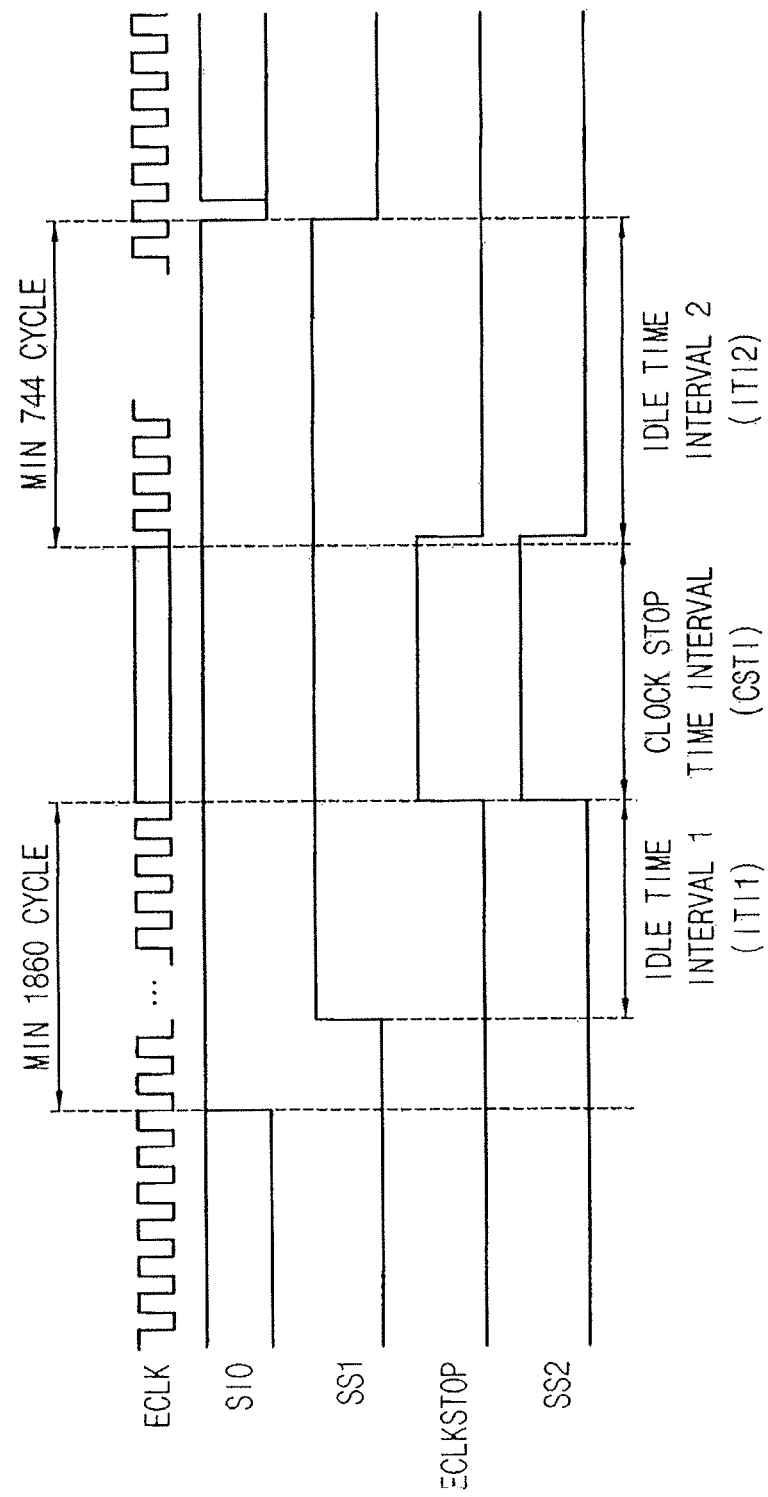
FIG. 2 is a timing diagram for describing the method of operating the smart card of FIG. 1.
Figure 3:
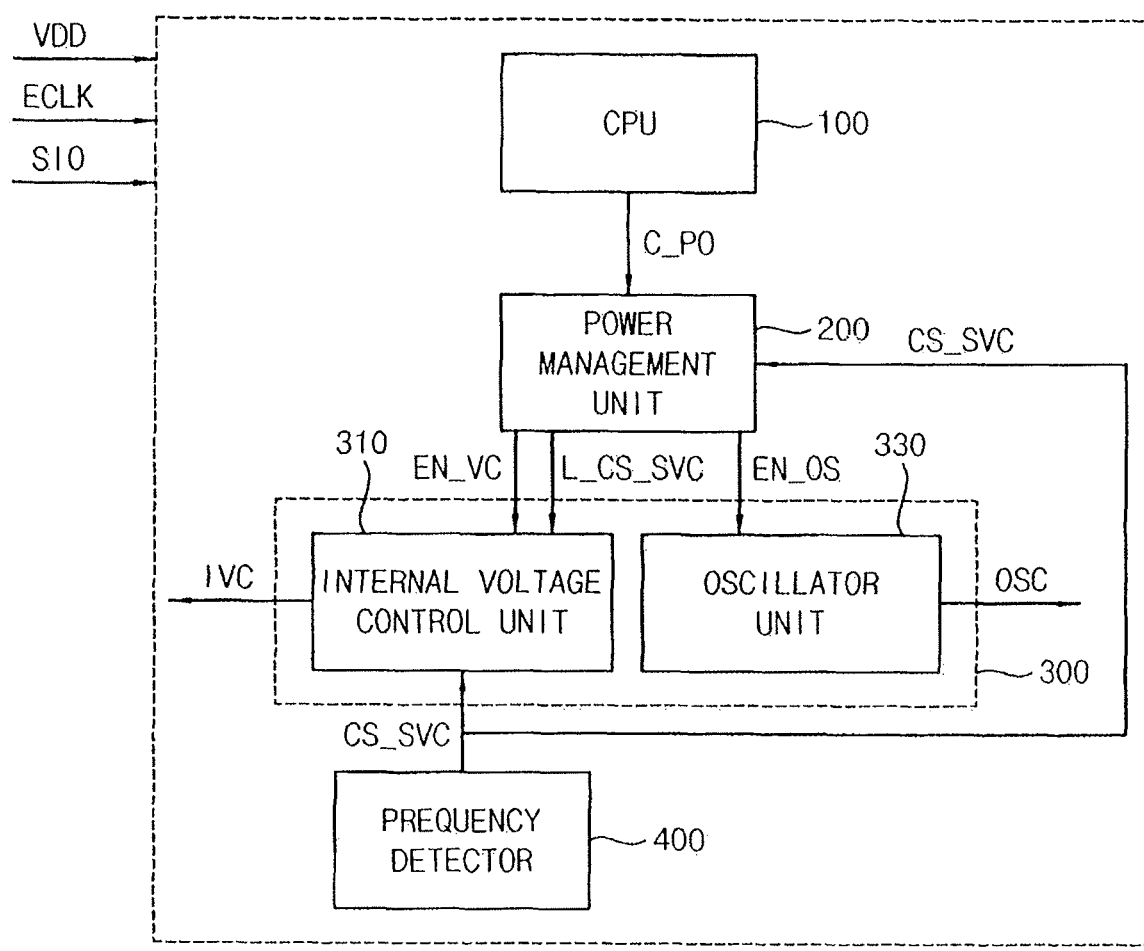
FIG. 3 is a block diagram illustrating a smart card according to exemplary embodiments.

FIG. 1 is a flow chart illustrating a method of operating a smart card according to exemplary embodiments, FIG. 2 is a timing diagram for describing a method of operating the smart card of FIG. 1 and FIG. 3 is a block diagram illustrating a smart card according to exemplary embodiments.

Referring to FIGS. 1 to 3, a smart card 10 may include a CPU 100, a power management unit 200, a plurality of sub-units 300 and a frequency detector 400. The smart card 10 may receive a power supply voltage VDD, an external clock signal ECLK and an input-output signal SIO. When data transmission is completed between the smart card 10 and a card reader, the CPU 100 may provide a power stop command C_PO to the power management unit 200. The power management unit 200 may activate or deactivate the sub-units 300 based on, that is, using, the enable signals EN_VC, EN_OS. Sub-units 300 may include an internal voltage control unit 310 and an oscillator unit 330. The internal voltage control unit 310 may provide an internal voltage based on, that is, in response to, a voltage controller enable signals EN_VC of the enable signals EN_VC, EN_OS that are provided from the power management unit 200. The oscillator unit 330 may provide an internal clock signal OSC based on, that is, in response to, an oscillator enable signal EN_OS of the enable signals EN_VC, EN_OS that are provided from the power management unit 200.

In the event the power management unit 200 deactivates the sub-units 300 based on the enable signals EN_VC, EN_OS, the power supply voltage that is provided to the sub-units 300 may be blocked. For example, in the event the power management unit 200 disables the voltage controller enable signal EN_VC of the enable signals EN_VC, EN_OS, the power supply voltage to the internal voltage control unit 310 may be blocked, or turned off, and, in turn, operation of the internal voltage control unit 310 may be stopped. In the event the power management unit 200 disables the oscillator enable signal EN_OS of the enable signals EN_VC, EN_OS, the power supply voltage to the oscillator unit 330 may be blocked, or turned off, and, in turn, operation of the oscillator unit 330 may be stopped.

In the event the power management unit 200 activates the sub-units 300 based on the state of enable signals EN_VC, EN_OS, the power supply voltage may be provided to the sub-units 300. For example, in the event the power management unit 200 enables the voltage controller enable signal of the enable signals EN_VC, EN_OS, the power supply voltage may be provided to the internal voltage control unit 310 and, as a result, the internal voltage control unit 310 may normally operate. In the event the power management unit 200 enables the oscillator enable signal EN_OS of the enable signals EN_VC, EN_OS, the power supply voltage may be provided to the oscillator unit 330 and, as a result, the oscillator unit 330 may normally operate.

The frequency detector 400 may detect whether the frequency of the external clock signal ECLK is within a predetermined range or not. During the clock stop time interval CSTI, the frequency detector 400 may stop detecting whether the frequency of the external clock signal ECLK is in the predetermined range and may detect only whether the external clock signal ECLK is activated or not. During the clock stop time interval CSTI, the power management unit 200 and a frequency detector 400 control voltages provided to sub-units 300 based on a control signal CS_SVC and level control signals L_CS_SVC. The control signal CS_SVC is generated from the frequency detector 400 by detecting the external clock signal ECLK. The level control signals L_CS_SVC are generated from the power management unit 200 based on the control signal CS_SVC. In the event the external clock signal ECLK is disabled, the frequency detector 400 may provide the control signal CS_SVC to the internal voltage control unit 310 and the power management unit 200 by detecting the deactivation of the external clock signal ECLK. The power management unit 200 may generate the level control signals L_CS_SVC based on the control signal CS_SVC. The power management unit 200 may control the voltages that are provided to the sub-units 300, based on the level control signals L_CS_SVC. A time interval when the external clock signal ECLK is deactivated may be the clock stop time interval CSTI. The level of the voltages that are provided to the sub-units 300 may be controlled based on the control signal CS_SVC and the level control signals L_CS_SVC. In the event the level of the voltages that are provided to the sub-units 300 is controlled, the level of the output voltages that are outputted from the sub-units 300 may be controlled.

In a method of operating a smart card 10 according to exemplary embodiments, a power management unit 200 deactivates a plurality of sub-units 300 based on a plurality of enable signals EN_VC, EN_OS during a first idle time interval ITI1 (S100). A first stop signal SS1 is a second logic level and a second stop signal SS2 is a first logic level based on, or in response to, an external clock signal ECLK during the first idle time interval ITI1 after data transmission is completed. The second stop signal SS2 may be generated from a frequency detector 400 based on an external clock signal ECLK. For example, the first logic level may be a logic low level and the second logic level may be a logic high level. When data transmission is completed between the smart card 10 and a card reader, the CPU 100 may provide the power stop command C_PO to the power management unit 200 and, as a result, the first stop signal SS1 may transition from the first logic level to the second logic level. Then, during the clock stop time interval CSTI, the frequency detector 400 may stop detecting whether the frequency of the external clock signal ECLK is within the predetermined range and may detect only whether the external clock signal ECLK is activated or not. The frequency detector 400 may detect the external clock signal ECLK. In the event the external clock signal ECLK is deactivated, the frequency detector 400 may detect the deactivation of the external clock signal ECLK. In the event the frequency detector 400 detects the deactivation of the external clock signal ECLK, the second stop signal SS2 may transition from the first logic level to the second logic level. The first idle time interval ITI1 may be a time interval when the first stop signal SS1 is the second logic level and the second stop signal SS2 is the first logic level after the data transmission is completed.

The power management unit 200 and a frequency detector 400 control voltages provided to sub units 300 based on a control signal CS_SVC and level control signals L_CS_SVC during a clock stop time interval CSTI (S110). The control signal CS_SVC is generated from the frequency detector 400. The level control signals L_CS_SVC are generated from the power management unit 200 based on the control signal CS_SVC. The first stop signal SS1 is the second logic level and the second stop signal SS2 is the second logic level based on the external clock signal ECLK during the clock stop time interval CSTI after the first idle time interval ITI1. For example, during the clock stop time interval CSTI, the frequency detector 400 may stop detecting whether the frequency of the external clock signal ECLK is within the predetermined range and may detect only whether the external clock signal ECLK is activated or not. The frequency detector 400 may detect the external clock signal ECLK. In the event the external clock signal ECLK is deactivated, the frequency detector 400 may detect the deactivation of the external clock signal ECLK. In the event the frequency detector 400 detects the deactivation of the external clock signal ECLK, the second stop signal SS2 may transition from the first logic level to the second logic level. While the external clock signal ECLK is deactivated, the second stop signal SS2 may be the second logic level.

During the clock stop time interval CSTI, the power supply voltage may be required in a part of the sub-units 300. In this case, during the clock stop time interval CSTI, a voltage level of the power supply voltage that is provided to the part of the sub-units 300 during the clock stop time interval CSTI may be less than the voltage level of the power supply voltage that is provided to the sub-units 300 during an active time interval when the data is transferred between the smart card 10 and the card reader. During the clock stop time interval CSTI, the voltage level of the power supply voltage that is provided to the part of the sub-units 300 may be decreased in order to reduce current consumption in sub-units 300.

The power management unit 200 activates the plurality of sub-units 300 based on the plurality of enable signals EN_VC, EN_OS during a second idle time interval ITI2 (S120). The first stop signal SS1 is the second logic level and the second stop signal SS2 is the first logic level based on the external clock signal ECLK during the second idle time interval ITI2 after the clock stop time interval CSTI. For example, the first stop signal SS1 may be the second logic level until the input-output signal SIO transitions to the logic low level after the clock stop time interval CSTI. In the event the external clock signal ECLK is activated after the clock stop time interval CSTI, the second stop signal SS2 may transition from the second logic level to the first logic level. The second idle time interval ITI2 may be a time interval when the first stop signal SS1 is the second logic level and the second stop signal SS2 is the first logic level after the clock stop time interval CSTI.

A method of operating a smart card 10 according to exemplary embodiments may decrease the power consumption by controlling the voltages that are provided to the sub-units 300 based on the control signal CS_SVC and the level control signals L_CS_SVC during the clock stop time interval CSTI.

Figure 4:
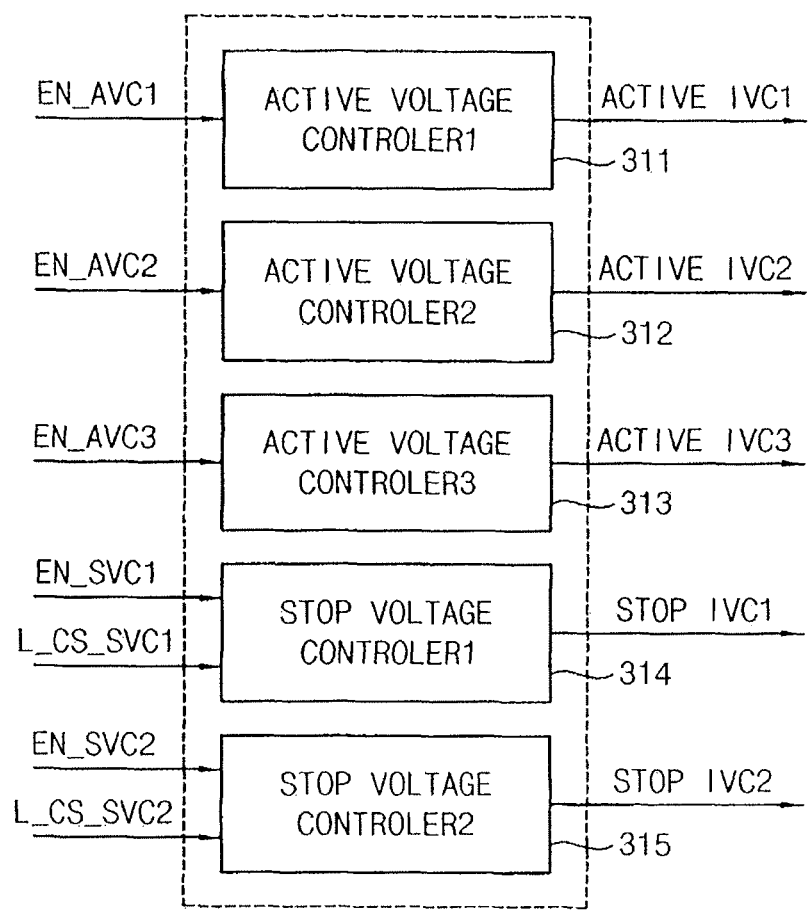
FIG. 4 is a block diagram illustrating an example of an internal voltage control unit included in the smart card of FIG. 3.
Figure 5:
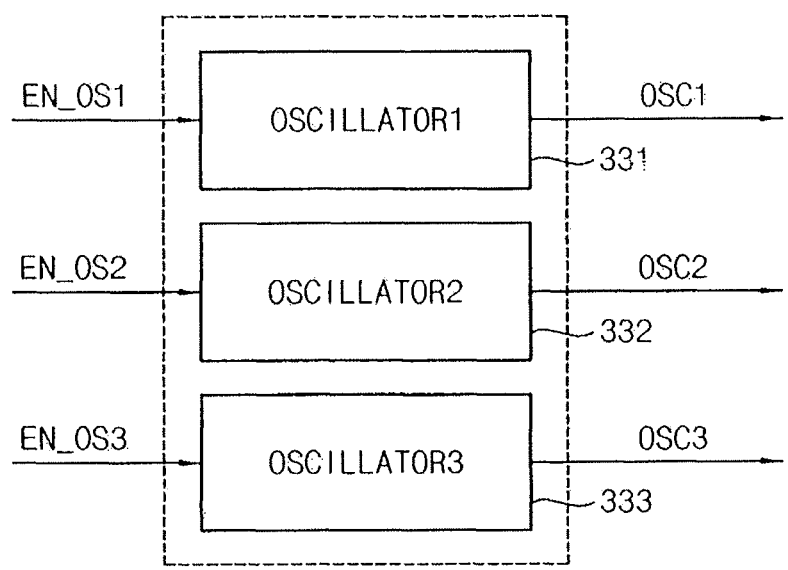
FIG. 5 is a block diagram illustrating an example of an oscillator unit included in the smart card of FIG. 3.

FIG. 4 is a block diagram illustrating an example of an internal voltage control unit included in the smart card of FIG. 3 and FIG. 5 is a block diagram illustrating an example of an oscillator unit included in the smart card of FIG. 3.

Referring to FIGS. 4 and 5, the plurality of sub-units 300 may include an internal voltage control unit 310 and an oscillator unit 330. The internal voltage control unit 310 may include a plurality of active voltage controllers 311 to 313 and a plurality of stop voltage controllers 314 and 315. The oscillator unit 330 may include a plurality of oscillators 331 to 333. The plurality of active voltage controllers 311 to 313, the plurality of stop voltage controllers 314 and 315 and the plurality of oscillators 331 to 333 may be activated and deactivated using the plurality of enable signals EN_VC, EN_OS.

The internal voltage control unit 310 may provide internal voltages used in the smart card 10 based on the power supply voltage VDD. The active voltage controllers 311 to 313 included in the internal voltage control unit 310 may provide the internal voltages ACTIVE IVC1 to ACTIVE IVC3 used in the smart card 10 during the active time interval. The stop voltage controllers 314 and 315 included in the internal voltage control unit 310 may provide the internal voltages STOP IVC1 to STOP IVC2 used in the smart card 10 during the stop mode time interval.

For example, during an active time interval, the first to third active voltage controller enable signals EN_AVC1, EN_AVC2 and EN_AVC3 may be enabled, in which case, the first to third active voltage controllers 311 to 313 may be normally operated. In the event the first to third active voltage controllers 311 to 313 are normally operated, the first to third active voltage controllers 311 to 313 may provide a first voltage. For example the first voltage may be 1.1V. For example, during active time interval, the first to second stop voltage controller enable signals EN_SVC1 and EN_SVC2 may be enabled, in which case, the first to second stop voltage controllers 314 and 315 may be normally operated. In the event the first to second stop voltage controllers 314 and 315 are normally operated, the first to second stop voltage controllers 314 and 315 may provide a first voltage. For example the first voltage may be 1.1V.

For example, the stop mode time interval may include the first idle time interval ITI1, the clock stop time interval CSTI and the second idle time interval ITI2. During the clock stop time interval CSTI of the stop mode time interval, the first to third active voltage controller enable signals may be disabled, in which case, the first to third active voltage controllers 311 to 313 may not be operated. In the event the first to third active voltage controllers 311 to 313 are not operated, the first to third active voltage controllers 311 to 313 may provide a ground voltage. For example, during the clock stop time interval CSTI, the first to second stop voltage controller enable signal may be enabled, in which case, the first to second stop voltage controllers 314 and 315 may be normally operated. In the event the first to second stop voltage controllers 314 and 315 are normally operated, the first to second stop voltage controllers 314 and 315 may provide the first voltage, which may be 1.1V.

The first to third oscillators 331 to 333 may be turned-on or turned-off based on the first to third oscillator enable signals EN_OS1, EN_OS2 and EN_OS3. In the event the first to third oscillator enable signals EN_OS1, EN_OS2 and EN_OS3 are enabled, the first to third oscillators 331 to 333 may provide a first to third clock signals.

Figure 6:
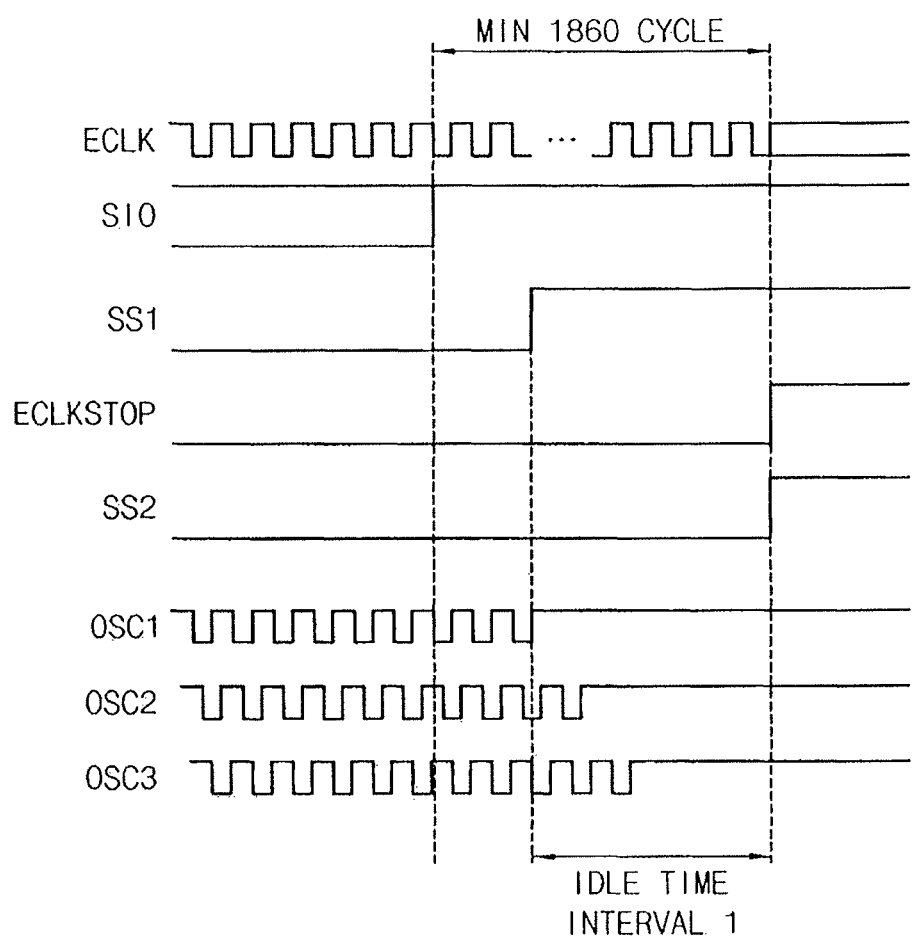
FIG. 6 is a timing diagram for describing an operation of an oscillator unit included in the smart card of FIG. 3 during a first idle time interval.

FIG. 6 is a timing diagram for describing operation of an oscillator unit included in the smart card of FIG. 3 during a first idle time interval.

Referring to FIG. 6, the first idle time interval ITI1 may be a time interval when the first stop signal SS1 is the second logic level and the second stop signal SS2 is the first logic level after the data transmission is completed.

In an exemplary embodiment, the external clock signal ECLK may be activated during the first idle time interval ITI1. For example, the frequency detector 400 may detect the external clock signal ECLK. In the event the external clock signal ECLK is deactivated, the frequency detector 400 may control the second stop signal SS2 so that the second stop signal SS2 transitions from the first logic level to the second logic level. During the first idle time interval ITI1, the external clock signal ECLK may be activated. During the clock stop time interval CSTI, the external clock signal ECLK may be deactivated. During the second idle time interval ITI2, the external clock signal ECLK may be activated.

In an exemplary embodiment, during the first idle time interval ITI1, the plurality of oscillators 331 to 333 may be sequentially turned-off based on oscillator enable signals EN_OS1, EN_OS2 and EN_OS3 of the plurality of enable signals EN_VC, EN_OS. For example, the oscillators 331 to 333 may include a first oscillator 331, a second oscillator 332 and a third oscillator 333. The oscillator enable signals EN_OS1, EN_OS2 and EN_OS3 of the enable signals EN_VC, EN_OS may include a first to third oscillator enable signals EN_OS1, EN_OS2 and EN_OS3. During the first idle time interval ITI1, the first to third oscillator enable signals EN_OS1, EN_OS2 and EN_OS3 may be sequentially disabled. For example, during the first idle time interval ITI1, the second oscillator enable signal EN_OS2 may be disabled after the first oscillator enable signal EN_OS1 is disabled and the third oscillator enable signal EN_OS3 may be disabled after the second oscillator enable signal EN_OS2 is disabled. As a result, the second oscillator 332 may be turned-off after the first oscillator 331 is turned-off and the third oscillator 333 may be turned-off after the second oscillator 332 is turned-off.

Figure 7:
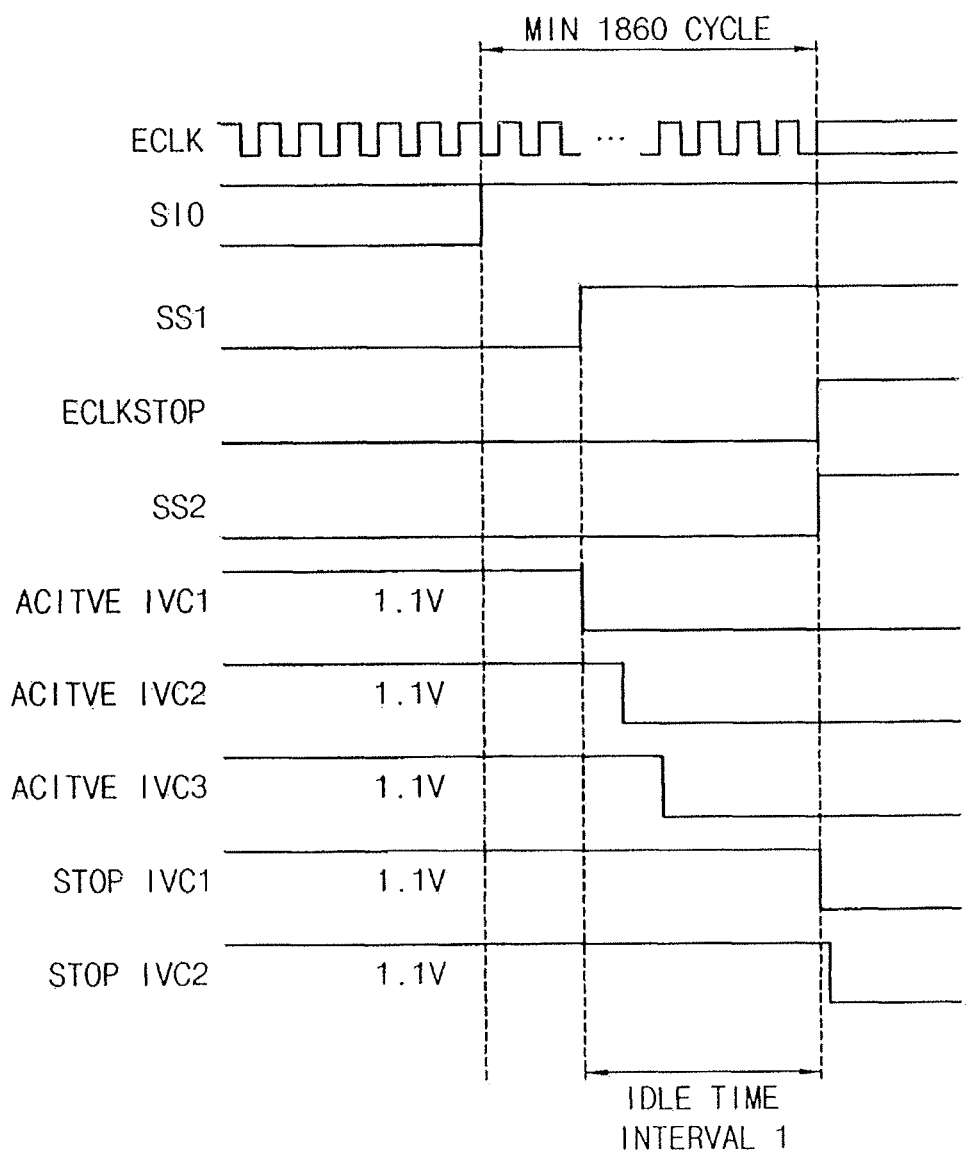
FIG. 7 is a timing diagram for describing an operation of an internal voltage control unit included in the smart card of FIG. 3 during a first idle time interval.

FIG. 7 is a timing diagram for describing operation of an internal voltage control unit included in the smart card of FIG. 3 during a first idle time interval.

Referring to FIGS. 4 and 7, the internal voltage control unit 310 may include a plurality of active voltage controllers 311 to 313 and a plurality of stop voltage controllers 314 and 315. The active voltage controllers 311 to 313 may include a first active voltage controller 311, a second active voltage controller 312 and a third active voltage controller 313. The stop voltage controllers 314 and 315 may include a first stop voltage controller 314 and a second stop voltage controller 315. For example, the first to third active voltage controllers 311 to 313 may provide first to third active voltages based on, in response to, the first to third active voltage controller enable signals EN_AVC1, EN_AVC2 and EN_AVC3. The first to second stop voltage controllers 314 and 315 may provide a first to second stop voltages based on, in response to, the first to second stop voltage controller enable signals EN_SVC1 and EN_SVC2.

In an exemplary embodiment, during the first idle time interval ITI1, the plurality of stop voltage controllers 314 and 315 may be turned-on based on stop voltage controller enable signals EN_SVC1 and EN_SVC2 of the plurality of enable signals EN_VC, EN_OS. For example, during the first idle time interval ITI1, the first to second stop voltage controller enable signals EN_SVC1 and EN_SVC2 may be enabled and, as a result, the first to second stop voltage controllers 314 and 315 may be turned-on.

In an exemplary embodiment, the plurality of active voltage controllers 311 to 313 may be sequentially turned-off based on active voltage controller enable signals EN_AVC1, EN_AVC2 and EN_AVC3 of the plurality of enable signals EN_VC, EN_OS. For example, the first to third active voltage controller enable signals EN_AVC1, EN_AVC2 and EN_AVC3 may be sequentially disabled during the first idle time interval ITI1, with the second active voltage controller enable signal EN_AVC2 may be disabled after the first active voltage controller enable signal EN_AVC1 is disabled and the third active voltage controller enable signal EN_AVC3 may be disabled after the second active voltage controller enable signal EN_AVC2 is disabled. As a result, the second active voltage controller 312 may be turned-off after the first active voltage controller 311 is turned-off and the third active voltage controller 313 may be turned-off after the second active voltage controller 312 is turned-off.

FIG. 8 is a timing diagram for describing states of an oscillator unit and an internal voltage control unit included in the smart card of FIG. 3 during a first idle time interval.

Referring to FIGS. 4, 5 and 8, the plurality of sub-units 300 may include an internal voltage control unit 310 and an oscillator unit 330. The internal voltage control unit 310 may include a plurality of active voltage controllers 311 to 313 and a plurality of stop voltage controllers 314 and 315. The oscillator unit 330 may include a plurality of oscillators 331 to 333. the first idle time interval ITI1 may be a time interval when the first stop signal SS1 is the second logic level and the second stop signal SS2 is the first logic level after the data transmission is completed.

During the first idle time interval ITI1, the active voltage controllers 311 to 313 included in the internal voltage control unit 310, the oscillators 331 to 333 included in the oscillator unit 330 may be sequentially turned-off and the stop voltage controllers 314 and 315 included in the internal voltage control unit 310 may be turned-on.

Figure 9:
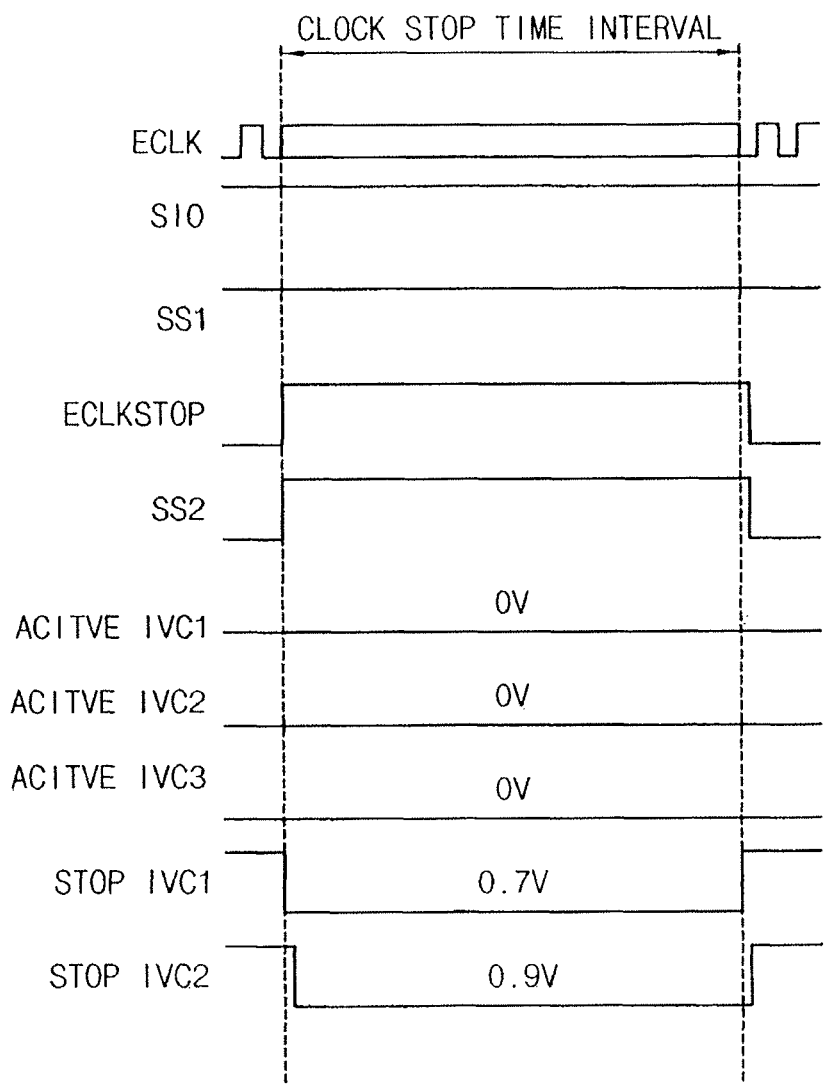
FIG. 9 is a timing diagram for describing an operation of an internal voltage control unit included in the smart card of FIG. 3 during a clock stop time interval.

FIG. 9 is a timing diagram for describing operation of an internal voltage control unit included in the smart card of FIG. 3 during a clock stop time interval.

Referring to FIGS. 3, 4 and 9, the clock stop time interval CSTI may be a time interval when the first stop signal SS1 and the second stop signal SS2 are the second logic level.

In an exemplary embodiment, the external clock signal ECLK may be deactivated during the clock stop time interval CSTI. For example, during the clock stop time interval CSTI, the frequency detector 400 may stop detecting whether the frequency of the external clock signal ECLK is within the predetermined range and may detect only whether the external clock signal ECLK is activated or not. The frequency detector 400 may detect the external clock signal ECLK. In the event the external clock signal ECLK is deactivated, the frequency detector 400 may control the second stop signal SS2 so that the second stop signal SS2 transitions from the first logic level to the second logic level.

During the first idle time interval ITI1, the external clock signal ECLK may be activated. During the clock stop time interval CSTI, the external clock signal ECLK may be deactivated. During the second idle time interval ITI2, the external clock signal ECLK may be activated.

In an exemplary embodiment, the frequency detector 400 and the power management unit 200 may control voltages which may be provided to the stop voltage controllers 314 and 315 based on stop voltage control signals of the level control signals L_CS_SVC and the control signal CS_SVC during the clock stop time interval CSTI. The level control signals L_CS_SVC may be generated from the power management unit 200 based on the control signal CS_SVC. For example, the stop voltage control signal may include a first stop voltage control signal L_CS_SVC1 and a second stop voltage control signal L_CS_SVC2. The stop voltage controllers 314 and 315 may include a first stop voltage controller 314 and a second stop voltage controller 315. The first stop voltage controller 314 and the second stop voltage controller 315 may provide a first stop voltage and a second stop voltage based on the first stop voltage control signal L_CS_SVC1 and the second stop voltage control signal L_CS_SVC2.

For example, during the clock stop time interval CSTI, the first stop voltage controller enable signal EN_SVC1 and the second stop voltage controller enable signal EN_SVC2 may be enabled, in which case, the first stop voltage controller 314 and the second stop voltage controller 315 may be turned-on. In the event the first stop voltage controller 314 and the second stop voltage controller 315 are turned-on during the clock stop time interval CSTI, the first stop voltage and the second stop voltage may be decreased based on the first stop voltage control signal L_CS_SVC1 and the second stop voltage control signal L_CS_SVC2.

In an exemplary embodiment, the stop voltage controllers 314 and 315 may include a first stop voltage controller 314 and a second stop voltage controller 315. A level of a first stop voltage that is provided from the first stop voltage controller 314 may be different from a level of a second stop voltage that is provided from the second stop voltage controller 315. For example, the first stop voltage may be 0.7V and the second stop voltage may be 0.9V FIG. 10 is a diagram for describing operation of stop voltage controllers included in the internal voltage control unit of FIG. 4.

Figure 10:
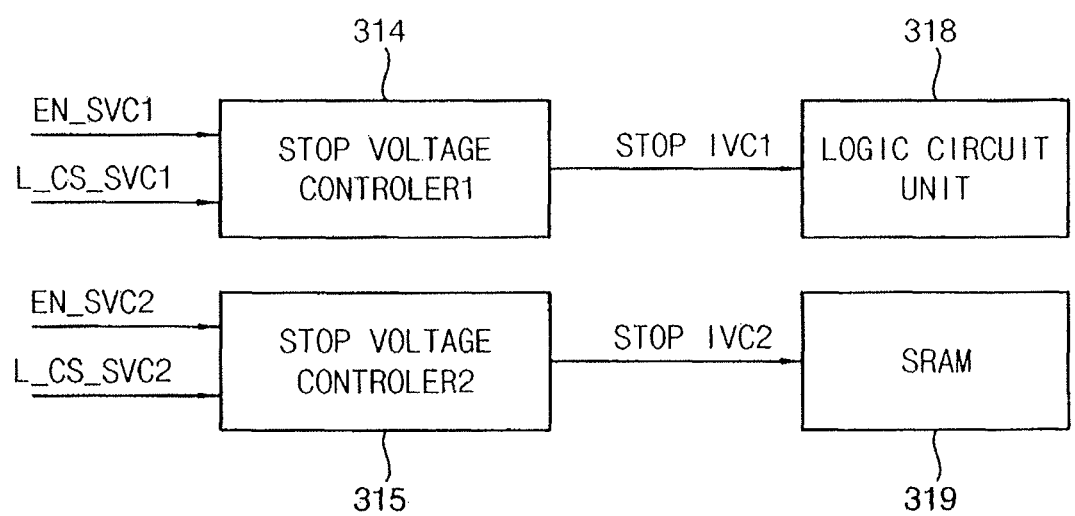
FIG. 10 is a diagram for describing operations of stop voltage controllers included in the internal voltage control unit of FIG. 4.

Referring to FIG. 10, during the clock stop time interval CSTI, the power supply voltage may be required in a part of the sub-units 300. For example, during the clock stop time interval CSTI, the power supply voltage may be required in a logic circuit unit 318 and SRAM 319 of the sub-units 300. During the clock stop time interval CSTI, the first stop voltage STOP IVC1 that is provided from the first stop voltage controller 314 may be provided to a logic circuit unit 318 included in the smart card 10. The second stop voltage STOP IVC2 that is provided from the second stop voltage controller 315 may be provided to SRAM 319 included in the smart card 10.

In this case, during the clock stop time interval CSTI, a voltage level of the power supply voltage that is provided to the part of the sub-units 300 during the clock stop time interval CSTI may be less than the voltage level of the power supply voltage that is provided to the sub-units 300 during an active time interval when the data is transferred between the smart card 10 and the card reader. For example, the voltage level that is provided to the logic circuit unit 318 and SRAM 319 during an active time interval when the data is transferred between the smart card 10 and the card reader may be 1.1V. The voltage level that is provided to the logic circuit unit 318 of the sub-units 300 during the clock stop time interval CSTI may be 0.7V. The voltage level that is provided to SRAM 319 of the sub-units 300 during the clock stop time interval CSTI may be 0.8V. In this manner, during the clock stop time interval CSTI, the voltage level of the power supply voltage that is provided to the logic circuit unit 318 and SRAM 319 of the sub-units 300 may be decreased. For example, the voltages that are provided to the sub-units 300 may include the first stop voltage STOP IVC1 and the second stop voltage STOP IVC2.

In an exemplary embodiment, during the clock stop time interval CSTI, the first stop voltage STOP IVC1 that is provided from the first stop voltage controller 314 may be provided to a logic circuit unit 318 included in the smart card 10. The second stop voltage STOP IVC2 that is provided from the second stop voltage controller 315 may be provided to SRAM 319 included in the smart card 10.

A method of operating a smart card 10 according to exemplary embodiments may decrease the power consumption by controlling the voltages that are provided to the sub-units 300 based on the control signal CS_SVC and the level control signals L_CS_SVC during the clock stop time interval CSTI.

FIG. 11 is a timing diagram for describing operation of an oscillator unit 330 included in the smart card of FIG. 3 during a clock stop time interval.

Referring to FIG. 11, the clock stop time interval CSTI may be a time interval when the first stop signal SS1 is the second logic level and the second stop signal SS2 is the second logic level.

In an exemplary embodiment, during the clock stop time interval CSTI, the plurality of oscillators 331 to 333 may be turned-off. The oscillator enable signal EN_OS may include first to third oscillator signals OSC1, OSC2 and OSC3. During the clock stop time interval CSTI, the first to third oscillator signals OSC1, OSC2 and OSC3 may be disabled and, as a result, the first to third oscillators 331 to 333 may be turned-off.

In an exemplary embodiment, during the clock stop time interval CSTI, the stop voltage controllers 314 and 315 may be turned-on and the active voltage controllers 311 to 313 may be turned-off. For example, the internal voltage control unit 310 may include a plurality of active voltage controllers 311 to 313 and a plurality of stop voltage controllers 314 and 315. The active voltage controllers 311 to 313 may include a first active voltage controller 311, a second active voltage controller 312 and a third active voltage controller 313. The stop voltage controllers 314 and 315 may include a first stop voltage controller 314 and a second stop voltage controller 315. The voltage controller enable signal may include the first to third active voltage controller enable signals EN_AVC1, EN_AVC2 and EN_AVC3 and the first to second stop voltage controller enable signals EN_SVC1 and EN_SVC2. During the clock stop time interval CSTI, the first to third active voltage controller enable signals EN_AVC1, EN_AVC2 and EN_AVC3 may be disabled and the first to second stop voltage controller enable signals EN_SVC1 and EN_SVC2 may be enabled. In the event, during the clock stop time interval CSTI, the first to third active voltage controller enable signals EN_AVC1, EN_AVC2 and EN_AVC3 are disabled and the first to second stop voltage controller enable signals EN_SVC1 and EN_SVC2 are enabled, the first to third active voltage controllers 311 to 313 may be turned-off and the first to second stop voltage controllers 314 and 315 may be turned-on.

FIG. 12 is a state diagram for describing states of an oscillator unit and an internal voltage control unit included in the smart card of FIG. 3 during a clock stop time interval.

Referring to FIGS. 4, 5 and 12, the plurality of sub-units 300 may include an internal voltage control unit 310 and an oscillator unit 330. The internal voltage control unit 310 may include a plurality of active voltage controllers 311 to 313 and a plurality of stop voltage controllers 314 and 315. The oscillator unit 330 may include a plurality of oscillators 331 to 333. The clock stop time interval CSTI may be a time interval when the first stop signal SS1 is the second logic level and the second stop signal SS2 is the second logic level.

During the clock stop time interval CSTI, the active voltage controllers 311 to 313 included in the internal voltage control unit 310 may be turned-off. During the clock stop time interval CSTI, the oscillators 331 to 333 included in the oscillator unit 330 may be turned-off. During the clock stop time interval CSTI, the stop voltage controllers 314 and 315 included in the internal voltage control unit 310 may be turned-on.

Figure 13:
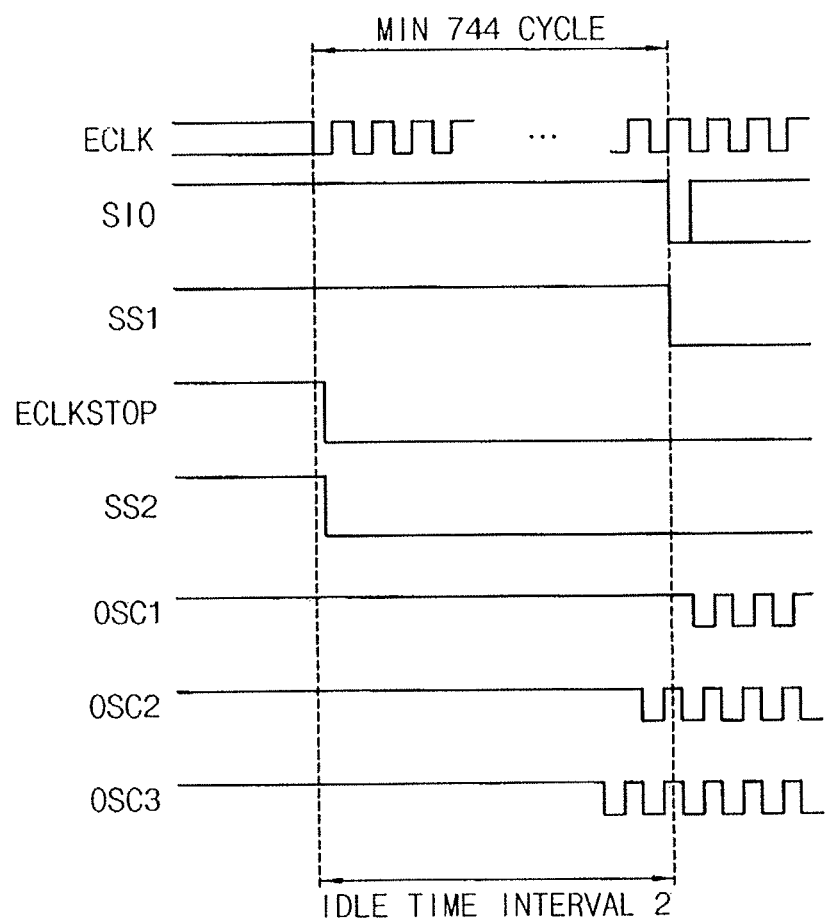
FIG. 13 is a timing diagram for describing an operation of an oscillator unit included in the smart card of FIG. 3 during a second idle time interval.

FIG. 13 is a timing diagram for describing operation of an oscillator unit included in the smart card of FIG. 3 during a second idle time interval.

Referring to FIGS. 5 and 13, the second idle time interval ITI2 may be a time interval when the first stop signal SS1 is the second logic level and the second stop signal SS2 is the first logic level after the clock stop time interval CSTI.

In an exemplary embodiment, the external clock signal ECLK may be activated during the second idle time interval ITI2. For example, the frequency detector 400 may detect the external clock signal ECLK. In the event the external clock signal ECLK is deactivated, the frequency detector 400 may control the second stop signal SS2 so that the second stop signal SS2 transitions from the first logic level to the second logic level. During the first idle time interval ITI1, the external clock signal ECLK may be activated. During the clock stop time interval CSTI, the external clock signal ECLK may be deactivated. During the second idle time interval ITI2, the external clock signal ECLK may be activated.

In an exemplary embodiment, during the second idle time interval ITI2, the plurality of oscillators 331 to 333 may be sequentially turned-on based on oscillator enable signals EN_OS1, EN_OS2 and EN_OS3 of the plurality of enable signals EN_VC, EN_OS. For example, the oscillators 331 to 333 may include a first oscillator 331, a second oscillator 332 and a third oscillator 333. The oscillator enable signals EN_OS1, EN_OS2 and EN_OS3 of the enable signals EN_VC, EN_OS may include first to third oscillator enable signals EN_OS1, EN_OS2 and EN_OS3. During the second idle time interval ITI2, the first to third oscillator enable signals EN_OS1, EN_OS2 and EN_OS3 may be sequentially enabled and, as a result, the second oscillator 332 may be turned-on after the first oscillator 331 is turned-on and the third oscillator 333 may be turned-on after the second oscillator 332 is turned-on.

Figure 14:
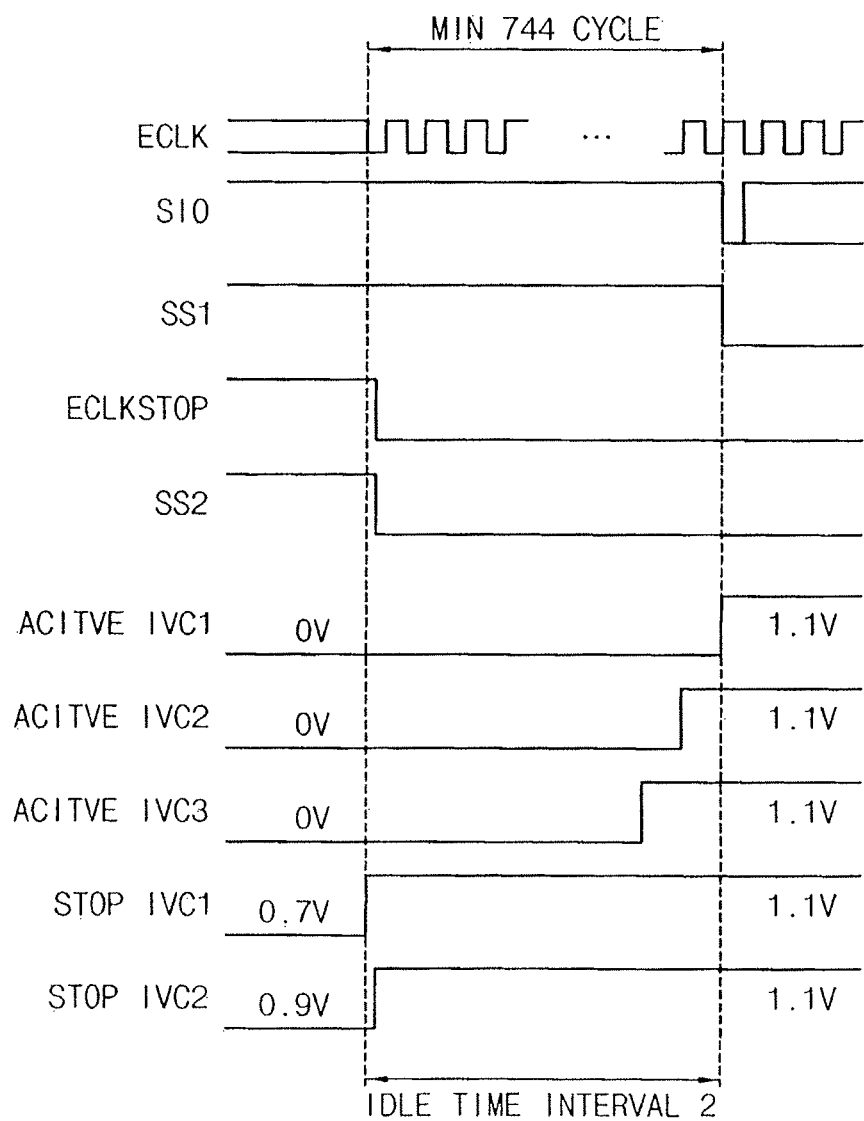
FIG. 14 is a timing diagram for describing an operation of an internal voltage control unit included in the smart card of FIG. 3 during a second idle time interval.

FIG. 14 is a timing diagram for describing operation of an internal voltage control unit included in the smart card of FIG. 3 during a second idle time interval.

Referring to FIGS. 4 and 14, the internal voltage control unit 310 may include a plurality of active voltage controllers 311 to 313 and a plurality of stop voltage controllers 314 and 315. The active voltage controllers 311 to 313 may include a first active voltage controller 311, a second active voltage controller 312 and a third active voltage controller 313. The stop voltage controllers 314 and 315 may include a first stop voltage controller 314 and a second stop voltage controller 315. For example, the first to third active voltage controllers 311 to 313 may provide a first to third active voltages based on the first to third active voltage controller enable signals EN_AVC1, EN_AVC2 and EN_AVC3. The first to second stop voltage controllers 314 and 315 may provide a first to second stop voltages based on the first to second stop voltage controller enable signals EN_SVC1 and EN_SVC2.

In an exemplary embodiment, during the second idle time interval ITI2, the stop voltage controllers 314 and 315 may be turned-on based on stop voltage controller enable signals EN_SVC1 and EN_SVC2. For example, during the second idle time interval ITI2, the first to second stop voltage controller enable signals EN_SVC1 and EN_SVC2 may be enabled and, as a result, the first to second stop voltage controllers 314 and 315 may be turned-on. In this case, the voltage level that is provided to the stop voltage controllers 314 and 315 may be controlled based on the stop voltage control signal. For example, during the second idle time interval ITI2, the voltage level that is provided to the stop voltage controllers 314 and 315 may be 1.1V.

During the second idle time interval ITI2, the plurality of active voltage controllers 311 to 313 may be sequentially turned-on based on active voltage controller enable signals EN_AVC1, EN_AVC2 and EN_AVC3 of the plurality of enable signals EN_VC, EN_OS. For example, the first to third active voltage controller enable signals EN_AVC1, EN_AVC2 and EN_AVC3 may be sequentially enabled. During the second idle time interval ITI2, the second active voltage controller enable signal EN_AVC2 may be enabled after the first active voltage controller enable signal EN_AVC1 is enabled and the third active voltage controller enable signal EN_AVC3 may be enabled after the second active voltage controller enable signal EN_AVC2 is enabled. In this case, the second active voltage controller 312 may be turned-on after the first active voltage controller 311 is turned-on and the third active voltage controller 313 may be turned-on after the second active voltage controller 312 is turned-on.

FIG. 15 is a state diagram for describing states of an oscillator unit and an internal voltage control unit included in the smart card of FIG. 3 during a second idle time interval.

Referring to FIGS. 4, 5 and 15, the plurality of sub-units 300 may include an internal voltage control unit 310 and an oscillator unit 330. The internal voltage control unit 310 may include a plurality of active voltage controllers 311 to 313 and a plurality of stop voltage controllers 314 and 315. The oscillator unit 330 may include a plurality of oscillators 331 to 333. The second idle time interval ITI2 may be a time interval when the first stop signal SS1 is the second logic level and the second stop signal SS2 is the first logic level after the clock stop time interval CSTI.

During the second idle time interval ITI2, the active voltage controllers 311 to 313 included in the internal voltage control unit 310 may be sequentially turned-on. During the second idle time interval ITI2, the oscillators 331 to 333 included in the oscillator unit 330 may be sequentially turned-on. During the first idle time interval ITI1, the stop voltage controllers 314 and 315 included in the internal voltage control unit 310 may be turned-on.

Figure 16:
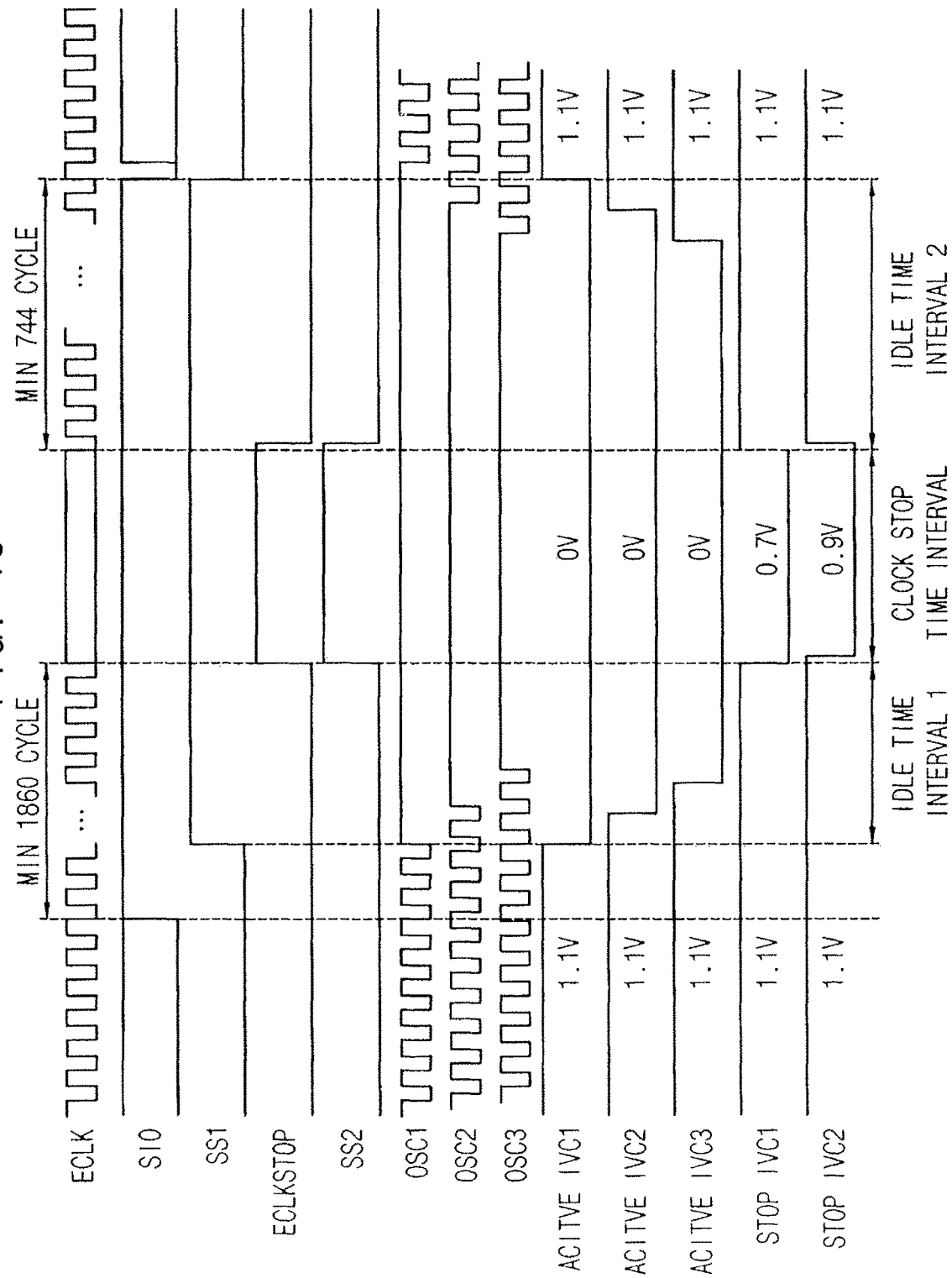
FIG. 16 is a diagram for describing operations of an oscillator unit and an internal voltage control unit included in the smart card of FIG. 3 during a first idle time interval, a clock stop time interval and a second idle time interval.

FIG. 16 is a timing diagram for describing operation of an oscillator unit and an internal voltage control unit included in the smart card of FIG. 3 during a first idle time interval, a clock stop time interval CSTI and a second idle time interval. FIG. 17 is a diagram illustrating a current specification according to ETSI TS 102 221 that is a specification of a smart card.

Referring to FIGS. 16 and 17, the plurality of sub-units 300 may include an internal voltage control unit 310 and an oscillator unit 330. The internal voltage control unit 310 may include a plurality of active voltage controllers 311 to 313 and a plurality of stop voltage controllers 314 and 315. The oscillator unit 330 may include a plurality of oscillators 331 to 333. the first idle time interval ITI1 may be a time interval when the first stop signal SS1 is the second logic level and the second stop signal SS2 is the first logic level after the data transmission is completed. The clock stop time interval CSTI may be a time interval when the first stop signal SST is the second logic level and the second stop signal SS2 is the second logic level. The second idle time interval ITI2 may be a time interval when the first stop signal SS1 is the second logic level and the second stop signal SS2 is the first logic level after the clock stop time interval CSTI.

During the first idle time interval ITI1, the plurality of active voltage controllers 311 to 313 may be sequentially turned-off based on active voltage controller enable signals EN_AVC1, EN_AVC2 and EN_AVC3 of the plurality of enable signals EN_VC, EN_OS. During the first idle time interval ITI1, the plurality of oscillators 331 to 333 may be sequentially turned-off based on oscillator enable signals EN_OS1, EN_OS2 and EN_OS3 of the plurality of enable signals EN_VC, EN_OS. During the first idle time interval ITI1, the plurality of stop voltage controllers 314 and 315 may be turned-on based on stop voltage controller enable signals EN_SVC1 and EN_SVC2 of the plurality of enable signals EN_VC, EN_OS.

During the clock stop time interval CSTI, the plurality of active voltage controllers 311 to 313 may be turned-off During the clock stop time interval CSTI, the plurality of oscillators 331 to 333 may be turned-off During the clock stop time interval CSTI, the plurality of stop voltage controllers 314 and 315 may be turned-on.

During the second idle time interval ITI2, the plurality of active voltage controllers 311 to 313 may be sequentially turned-on based on active voltage controller enable signals EN_AVC1, EN_AVC2 and EN_AVC3 of the plurality of enable signals EN_VC, EN_OS. During the first idle time interval ITI1, the plurality of oscillators 331 to 333 may be sequentially turned-on based on oscillator enable signals EN_OS1, EN_OS2 and EN_OS3 of the plurality of enable signals EN_VC, EN_OS. During the first idle time interval ITI1, the plurality of stop voltage controllers 314 and 315 may be turned-on based on stop voltage controller enable signals EN_SVC1 and EN_SVC2 of the plurality of enable signals EN_VC, EN_OS.

In class B and the class C, the current according to European Telecommunications Standards Institute Technical Specification (ETSI TS) 102 221, which is a specification of the smart card 10, may be less than 200 uA during the idle time interval. In class B and the class C, the current according to ETSI TS 102 221 may be less than 100 uA during the clock stop time interval CSTI. The current according to ETSI TS 102 221 during the idle time interval may be less than the current according to ETSI TS 102 221 during the clock stop time interval CSTI. The method of operating a smart card 10 according to exemplary embodiments may decrease the power consumption by controlling the voltages that are provided to the sub-units 300 based on the control signal CS_SVC and the level control signals L_CS_SVC during the clock stop time interval CSTI.

Figure 18:
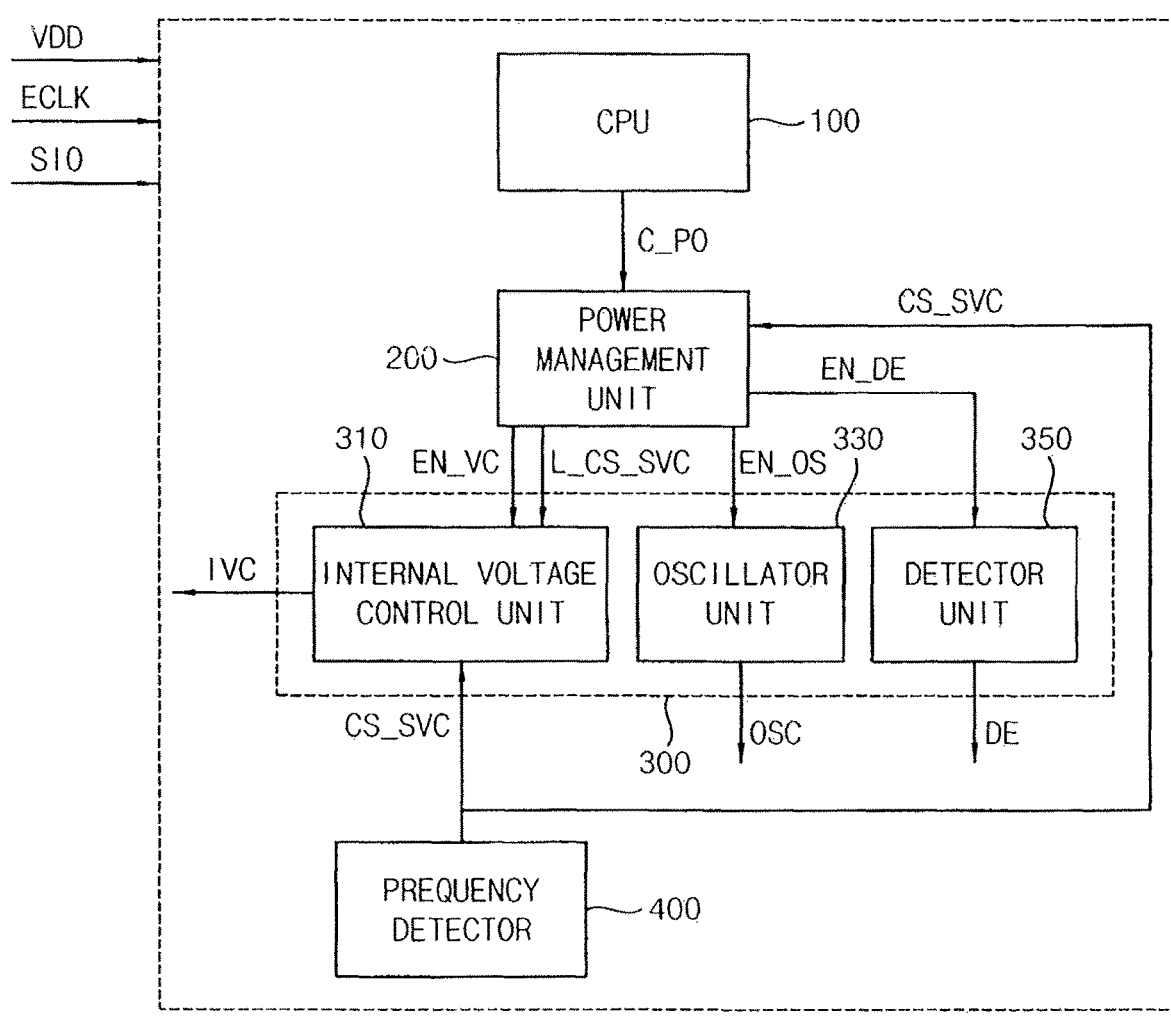
FIG. 18 is a block diagram illustrating a smart card according to an exemplary embodiment.
Figure 19:
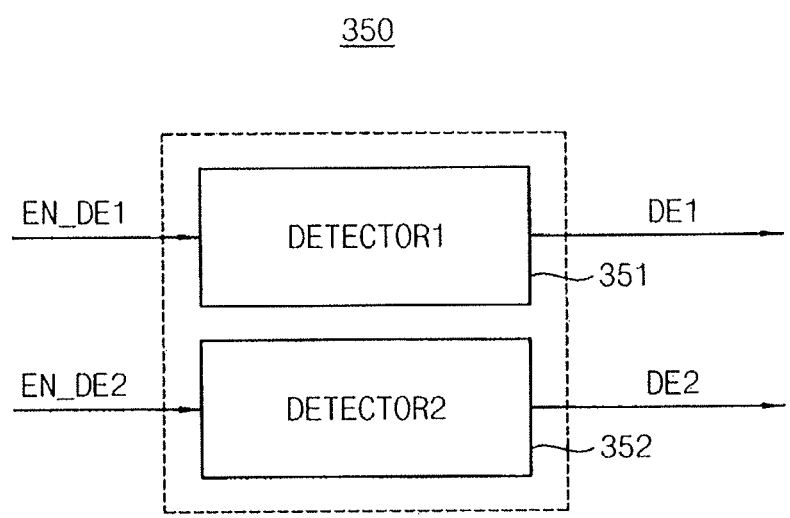
FIG. 19 is a block diagram illustrating an example of a detector unit included in the smart card of FIG. 18.

FIG. 18 is a block diagram illustrating a smart card according to an exemplary embodiment and FIG. 19 is a block diagram illustrating an example of a detector unit included in the smart card of FIG. 18.

Referring to FIGS. 18 and 19, a smart card 10a may include a CPU 100, a power management unit 200, a plurality of sub-units 300, a frequency detector 400 and a detector unit 350. The smart card 10 may receive a power supply voltage VDD, an external clock signal ECLK and input-output signal SIO. When data transmission is completed between the smart card 10 and a card reader, the CPU 100 may provide a power stop command C_PO to the power management unit 200. The power management unit 200 may activate or deactivate the sub-units 300 based on the enable signals EN_VC, EN_OS.

In the event the power management unit 200 deactivates the sub-units 300 based on the enable signals EN_VC, EN_OS, the power supply voltage that is provided to the sub-units 300 may be blocked (also referred to herein as, "turned off," or "cut off," or "disabled"). In the event the power management unit 200 activates the sub-units 300 based on the enable signals EN_VC, EN_OS, the power supply voltage may be provided to the sub-units 300.

The frequency detector 400 may detect whether the frequency of the external clock signal ECLK is within a predetermined range or not. During the clock stop time interval CSTI, the frequency detector 400 may stop detecting whether the frequency of the external clock signal ECLK is within the predetermined range and may detect only whether the external clock signal ECLK is activated or not. During the clock stop time interval CSTI, the power management unit 200 and a frequency detector 400 control voltages provided to sub-units 300, based on a control signal CS_SVC and level control signals L_CS_SVC. The control signal CS_SVC is generated from the frequency detector 400 by detecting the external clock signal ECLK. The level control signals L_CS_SVC are generated from the power management unit 200 based on the control signal CS_SVC. In the event the external clock signal ECLK is disabled, the frequency detector 400 may provide the control signal CS_SVC to the internal voltage control unit 310 and the power management unit 200 by detecting the deactivation of the external clock signal ECLK. The power management unit 200 may generate the level control signals L_CS_SVC based on the control signal CS_SVC. The power management unit 200 may control the voltages that are provided to the sub-units 300, based on the level control signals L_CS_SVC. A time interval when the external clock signal ECLK is deactivated may be the clock stop time interval CSTI. The level of the voltages that are provided to the sub-units 300 may be controlled based on the control signal CS_SVC and the level control signals L_CS_SVC. In the event the level of the voltages that are provided to the sub-units 300 is controlled, the level of the output voltages that are outputted from the sub-units 300 may be controlled.

In an exemplary embodiment, the plurality of sub-units 300 may further include a detector unit 350. The detector unit 350 may include a plurality of detectors that detect an internal environment of the smart card 10. The plurality of detectors may be activated and deactivated based on the plurality of enable signals EN_VC, EN_OS. For example, the detectors may include a first detector 351 and a second detector 352. The first detector 351 may detect temperature in the smart card 10. The second detector 352 may detect a voltage level of the sub-units 300. The first detector 351 may be turned-on or turned-off based on a first detector enable signal EN_DE1. The second detector 352 may be turned-on or turned-off based on a second detector enable signal EN_DE2. The first detector 351 may provide a detection result of the temperature as a first detector result signal DEL. The second detector 352 may provide a detection result of the voltage level as a second detector result signal DE2.

Figure 20:
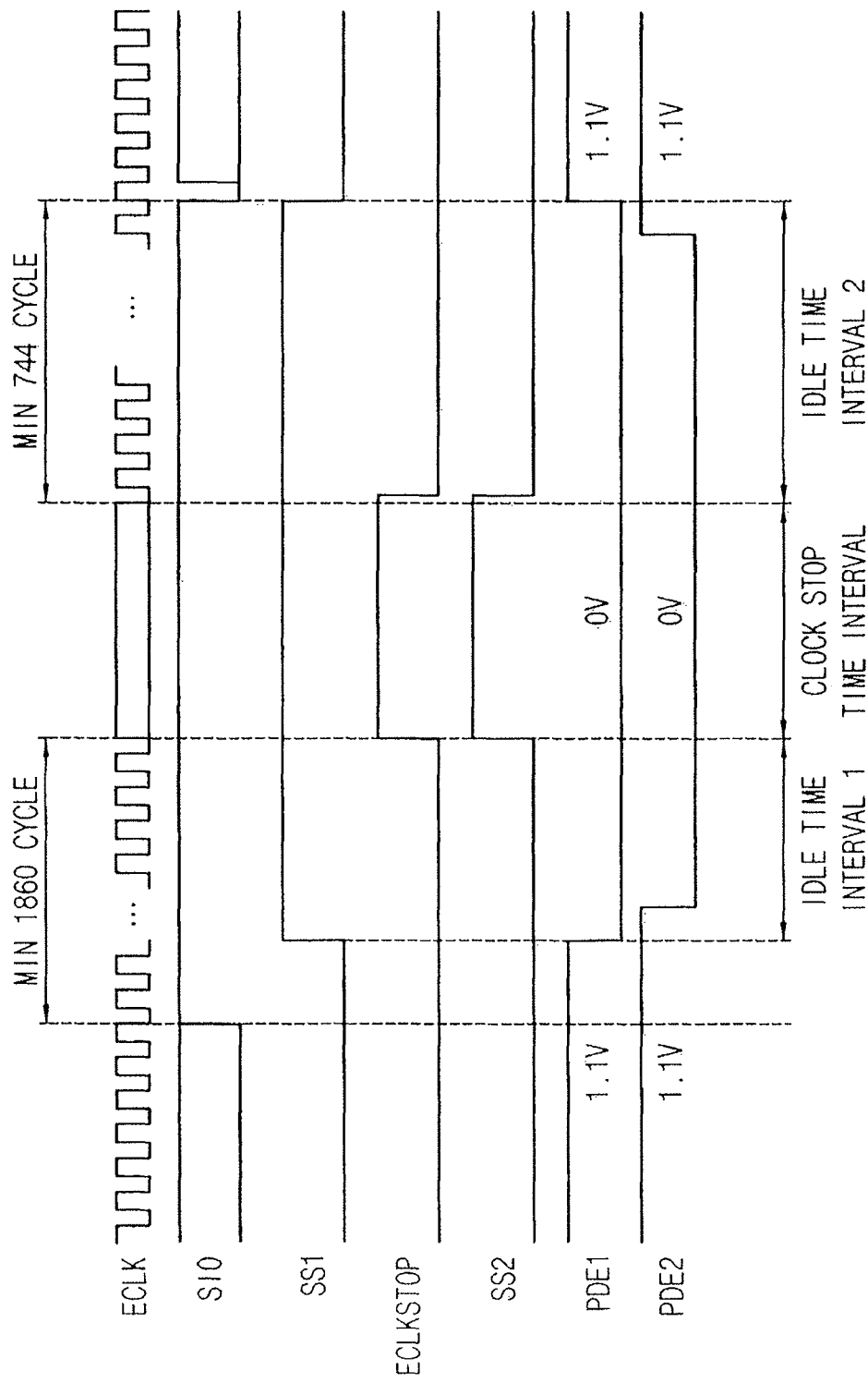
FIG. 20 is a diagram for describing operations of a detector unit included in the smart card of FIG. 18 during a first idle time interval, a clock stop time interval and a second idle time interval.

FIG. 20 is a timing diagram for describing operation of a detector unit included in the smart card of FIG. 18 during a first idle time interval, a clock stop time interval and a second idle time interval.

Referring to FIG. 20, during the first idle time interval ITI1, the plurality of detectors may be sequentially turned-off based on detector enable signals of the plurality of enable signals EN_VC, EN_OS. During the clock stop time interval CSTI, the plurality of detectors may be turned-off During the second idle time interval ITI2, the plurality of detectors may be sequentially turned-on based on the detector enable signals EN_VC, EN_OS. For example, during the first idle time interval ITI1, the second detector enable signal EN_DE2 may be disabled after the first detector enable signal EN_DE1 is disabled. In this case, the second detector 352 may be turned-off after the first detector 351 is turned-off During the clock stop time interval CSTI, the first detector enable signal EN_DE1 and the second detector enable signal EN_DE2 may be disabled. In this case, the first detector 351 and the second detector may be turned-off. During the second idle time interval ITI2, the second detector enable signal EN_DE2 may be enabled after the first detector enable signal EN_DE1 is enabled. In this case, the second detector may be turned-on after the first detector 351 is turned-on.

Figure 21:
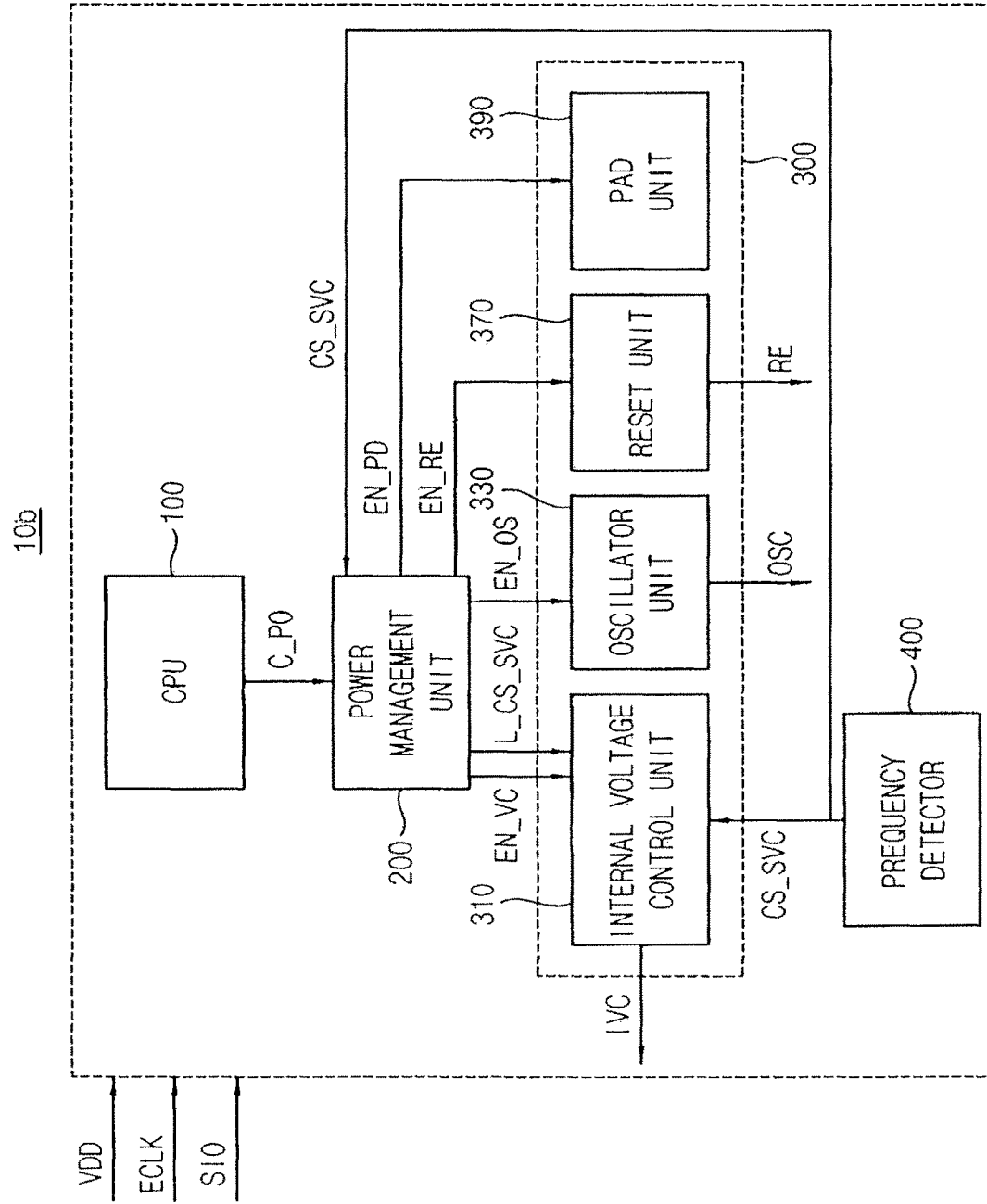
FIG. 21 is a block diagram illustrating a smart card according to exemplary embodiments.
Figure 22:
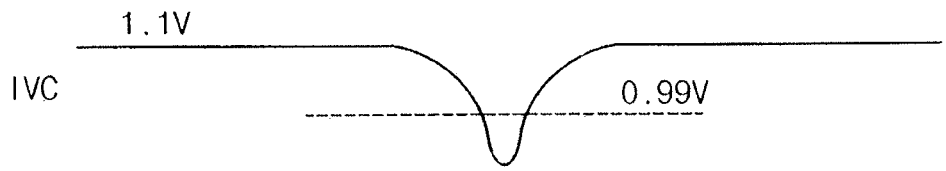
FIG. 22 is a diagram for describing an operation of a reset unit included in the smart card of FIG. 21.

FIG. 21 is a block diagram illustrating a smart card according to exemplary embodiments and FIG. 22 is a diagram for describing operation of a reset unit included in the smart card of FIG. 21.

Referring to FIGS. 21 and 22, smart card 10b may include a CPU 100, a power management unit 200, a plurality of sub-units 300, a frequency detector 400, a reset unit 370 and a pad unit 390. The smart card 10b may receive a power supply voltage VDD, an external clock signal ECLK and input-output signal SIO. When data transmission is completed between the smart card 10b and a card reader, the CPU 100 may provide a power stop command C_PO to the power management unit 200. The power management unit 200 may activate or deactivate the sub-units 300 based on the enable signals EN_VC, EN_OS. The frequency detector 400 may detect whether the frequency of the external clock signal ECLK is within a predetermined range or not. During the clock stop time interval CSTI, the frequency detector 400 may stop detecting whether the frequency of the external clock signal ECLK is within the predetermined range and may detect only whether the external clock signal ECLK is activated or not. During the clock stop time interval CSTI, the power management unit 200 and a frequency detector 400 control voltages provided to sub-units 300, based on a control signal CS_SVC and level control signals L_CS_SVC. The control signal CS_SVC is generated from the frequency detector 400 by detecting the external clock signal ECLK. The level control signals L_CS_SVC are generated from the power management unit 200 based on the control signal CS_SVC.

In an exemplary embodiment, the plurality of sub-units 300 may further include a reset unit 370. The reset unit 370 may reset the smart card 10b in the event internal voltage of the smart card 10b is less than a predetermined voltage. During the clock stop time interval CSTI, the reset unit 370 may be turned-off based on a reset enable signal EN_RE of the plurality of enable signals EN_VC, EN_OS and EN_RE. For example, in the event the voltage that is provided from the internal voltage control unit 310 is less than 0.99V, the reset unit 370 may reset the smart card 10b. During the clock stop time interval CSTI, the voltage that is provided from the internal voltage control unit 310 may be less than 0.99V. If the reset unit 370 is turned-off during the clock stop time interval CSTI, the smart card 10*b* may not be reset even though the voltage that is provided from the internal voltage control unit 310 is less than 0.99V. Therefore, during the clock stop time interval CSTI, the reset unit 370 may be turned-off based on a reset enable signal EN_RE.

In an exemplary embodiment, the plurality of sub-units 300 may further include a pad unit 390 that receives external signals. During the clock stop time interval CSTI, the pad unit 390 may be turned-on and turned-off based on a pad enable signal EN_PD of the plurality of enable signals. For example, during the clock stop time interval CSTI, the power supply voltage may be provided to a clock pad. In this case, the clock pad included in the pad unit 390 may be turned-on. For example, during the clock stop time interval CSTI, data may not be transferred through an input-output pad. Therefore the power supply voltage may be blocked in the input-output pad. In this case, the input-output pad included in the pad unit 390 may be turned-off.

Figure 23:
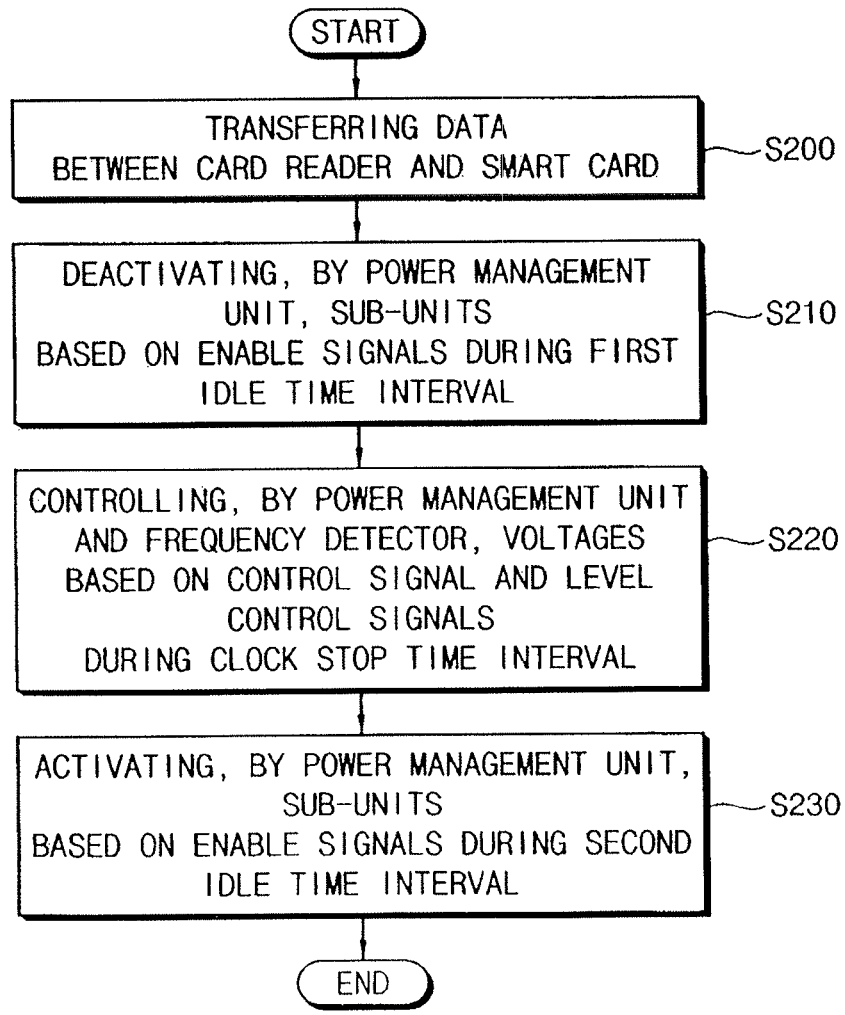
FIG. 23 is a flow chart illustrating a method of operating a smart card system according to exemplary embodiments.
Figure 24:
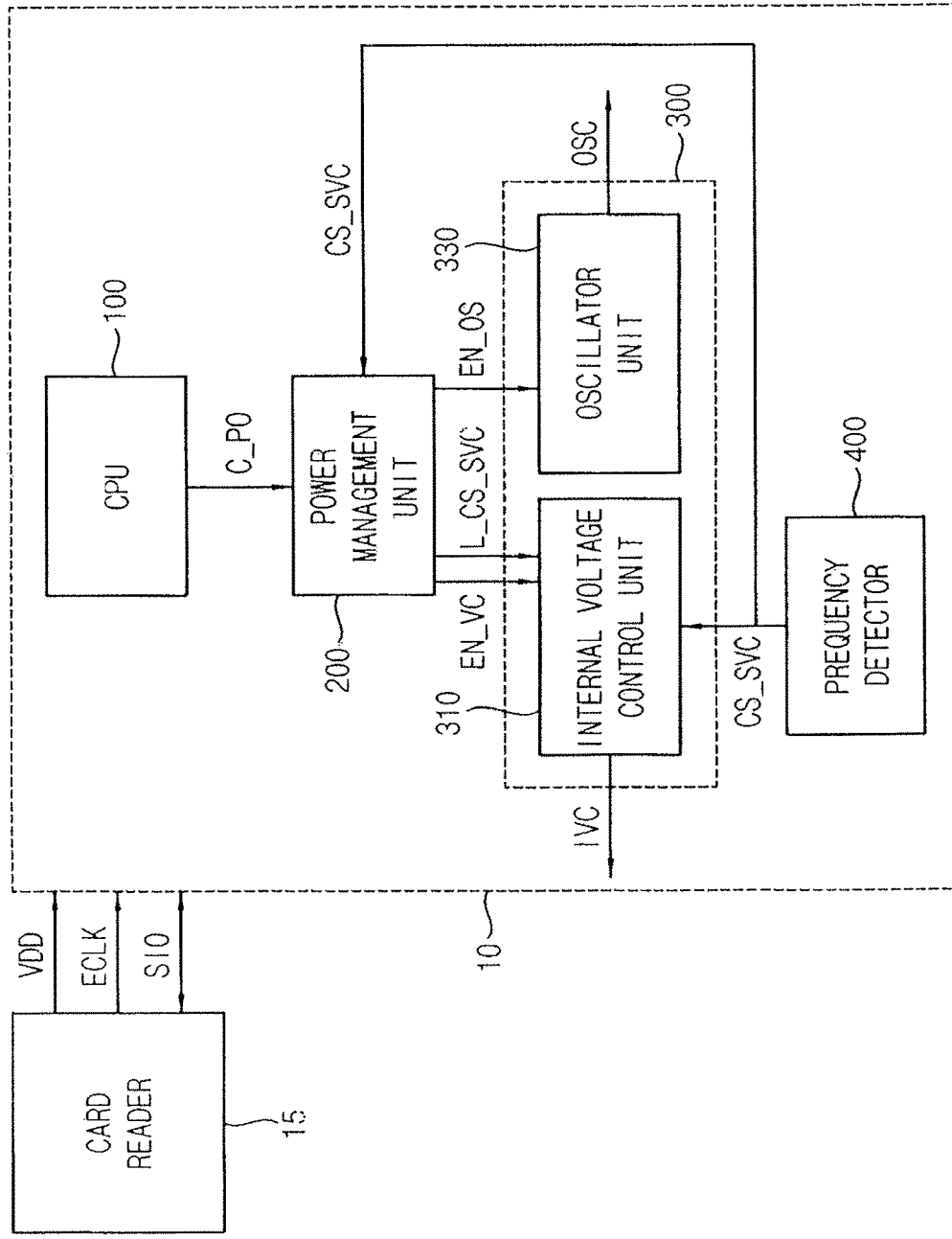
FIG. 24 is a block diagram illustrating a smart card system according to exemplary embodiments.

FIG. 23 is a flow chart illustrating a method of operating a smart card system according to exemplary embodiments and FIG. 24 is a block diagram illustrating a smart card system according to exemplary embodiments.

Referring to FIGS. 23 and 24, a smart card system 20 may include a card reader 15 and a smart card 10. The card reader 15 may provide a power supply voltage VDD, an external clock signal ECLK and an input-output signal SIO. The smart card 10 may include a CPU 100, a power management unit 200, a plurality of sub-units 300 and a frequency detector 400. The smart card 10 may receive a power supply voltage VDD, an external clock signal ECLK and input-output signal SIO. When data transmission is completed between the smart card 10 and a card reader, the CPU 100 may provide a power stop command C_PO to the power management unit 200. The power management unit 200 may activate or deactivate the sub-units 300 based on the enable signals EN_VC, EN_OS.

The frequency detector 400 may detect whether the frequency of the external clock signal ECLK is within a predetermined range or not. During the clock stop time interval CSTI, the frequency detector 400 may stop detecting whether the frequency of the external clock signal ECLK is in the predetermined range and may detect only whether the external clock signal ECLK is activated or not. During the clock stop time interval CSTI, the power management unit 200 and a frequency detector 400 control voltages provided to sub-units 300, based on a control signal CS_SVC and level control signals L_CS_SVC. The control signal CS_SVC is generated from the frequency detector 400 by detecting the external clock signal ECLK. The level control signals L_CS_SVC are generated from the power management unit 200 based on the control signal CS_SVC. In the event the external clock signal ECLK is disabled, the frequency detector 400 may provide the control signal CS_SVC to the internal voltage control unit 310 and the power management unit 200 by detecting the deactivation of the external clock signal ECLK. The power management unit 200 may generate the level control signals L_CS_SVC based on the control signal CS_SVC. The power management unit 200 may control the voltages that are provided to the sub-units 300, based on the level control signals L_CS_SVC. A time interval when the external clock signal ECLK is deactivated may be the clock stop time interval CSTI. The level of the voltages that are provided to the sub-units 300 may be controlled based on the control signal CS_SVC and the level control signals L_CS_SVC. In the event the level of the voltages that are provided to the sub-units 300 is controlled, the level of the output voltages that are outputted from the sub-units 300 may be controlled.

In a method of operating a smart card 10 according to exemplary embodiments, data is transferred between the card reader and the smart card 10 (S200). The power management unit 200 deactivates a plurality of sub-units 300 based on a plurality of enable signals EN_VC, EN.sub.--OS during a first idle time interval ITI1 (S210). A first stop signal SS1 is a second logic level and a second stop signal SS2 is a first logic level based on a external clock signal ECLK during the first idle time interval ITI1 after data transmission is completed.

The power management unit 200 and a frequency detector 400 control voltages provided to sub-units 300, based on a control signal CS_SVC and level control signals L_CS_SVC during a clock stop time interval CSTI (S220). The control signal CS_SVC is generated from the frequency detector 400. The level control signals L_CS_SVC are generated from the power management unit 200 based on the control signal CS_SVC. The first stop signal SS1 is the second logic level and the second stop signal SS2 is the second logic level based on the external clock signal ECLK during the clock stop time interval CSTI after the first idle time interval ITI1. The power management unit 200 activates the plurality of sub-units 300 based on the plurality of enable signals EN_VC, EN_OS during a second idle time interval ITI2 (S230). The first stop signal SS1 is the second logic level and the second stop signal SS2 is the first logic level based on the external clock signal ECLK during the second idle time interval ITI2 after the clock stop time interval CSTI. The method of operating a smart card 10 according to exemplary embodiments may decrease the power consumption by controlling the voltages that are provided to the sub-units 300 based on the control signal CS_SVC and the level control signals L_CS_SVC during the clock stop time interval CSTI.

Figure 25:
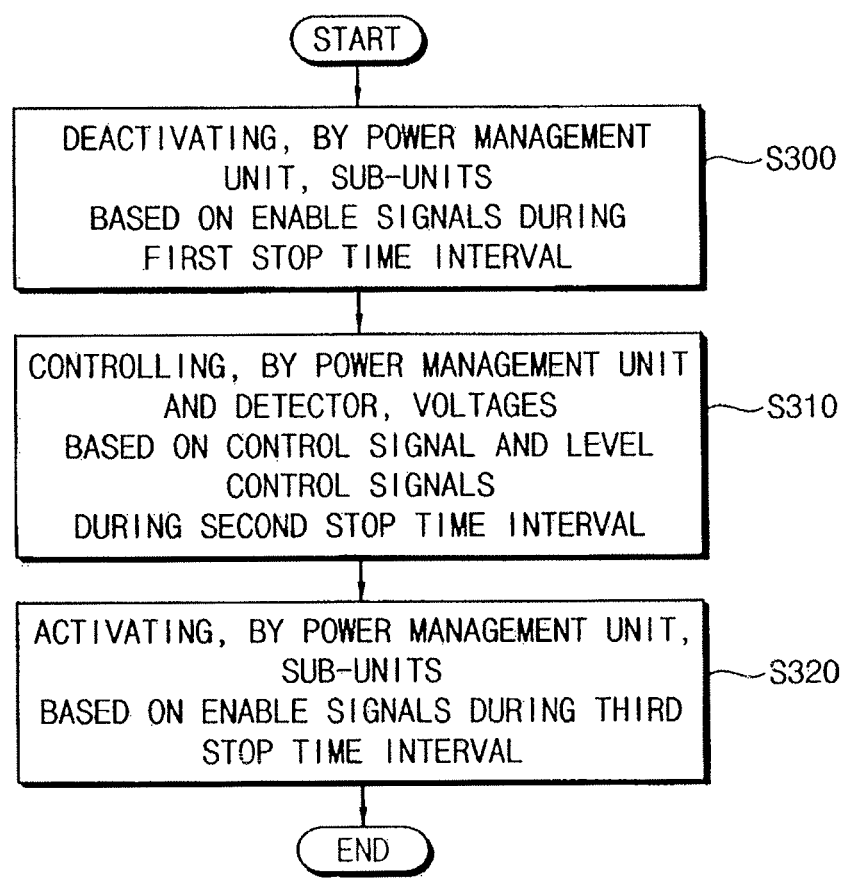
FIG. 25 is a flow chart illustrating a method of operating a smart card according to exemplary embodiments.
Figure 26:
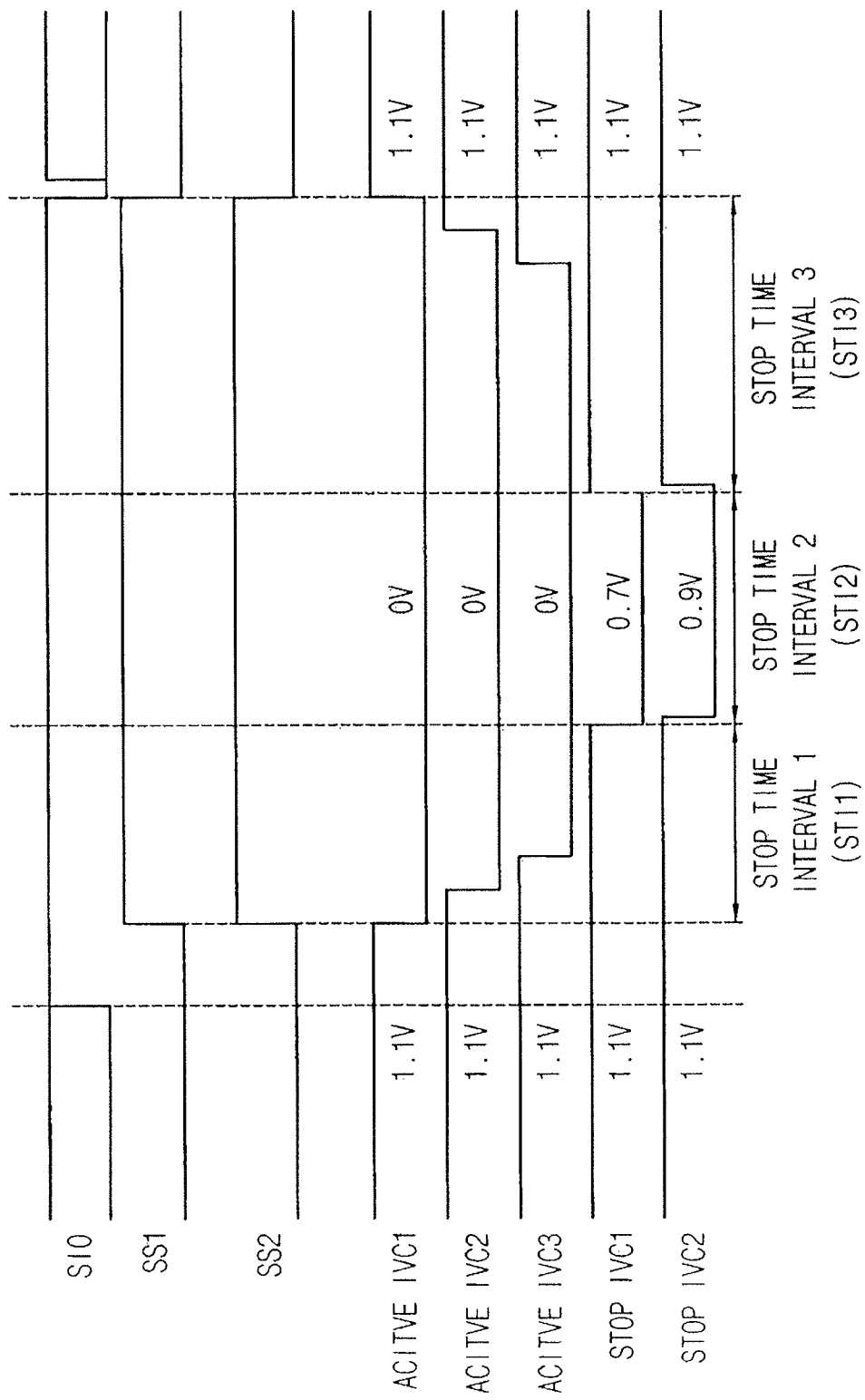
FIG. 26 is a timing diagram for describing the method of operating the smart card of FIG. 25.

FIG. 25 is a flow chart illustrating a method of operating a smart card according to exemplary embodiments and FIG. 26 is a timing diagram for describing the method of operating the smart card of FIG. 25.

Referring to FIGS. 25 and 26, in a method of operating a smart card 10, a power management unit 200 deactivates a plurality of sub-units 300 based on a plurality of enable signals EN_VC, EN_OS during a first stop time interval STI1 (S300). A first stop signal SS1 is a second logic level and a second stop signal SS2 is a first logic level based on the first stop signal SS1 during the first stop time interval STI1 after data transmission is completed. The second stop signal SS2 may be generated from the detector based on the first stop signal SS1. For example, in the event the external clock signal ECLK is not provided to the smart card 10, the method of operating the smart card 10 that is described in FIGS. 25 and 26 may be applied.

The power management unit 200 and a detector control voltages provided to sub-units 300, based on a control signal CS_SVC and level control signals L_CS_SVC during a second stop time interval STI2 after the first stop time interval STI1 (S310). The control signal CS_SVC is generated from the detector. The level control signals L_CS_SVC are generated from the power management unit 200 based on the control signal CS_SVC. The power management unit 200 activates the plurality of sub-units 300 based on the plurality of enable signals EN_VC, EN_OS during a third stop time interval STI3 (S320). In exemplary embodiments the third stop time interval STI3 is before the first stop signal SS1 transitions from the second logic level to the first logic level after the second stop time interval STI2. The method of operating a smart card 10 according to exemplary embodiments may decrease the power consumption by controlling the voltages that are provided to the sub-units 300 based on the control signal CS_SVC and the level control signals L_CS_SVC during the second stop time interval STI2.

Figure 27:
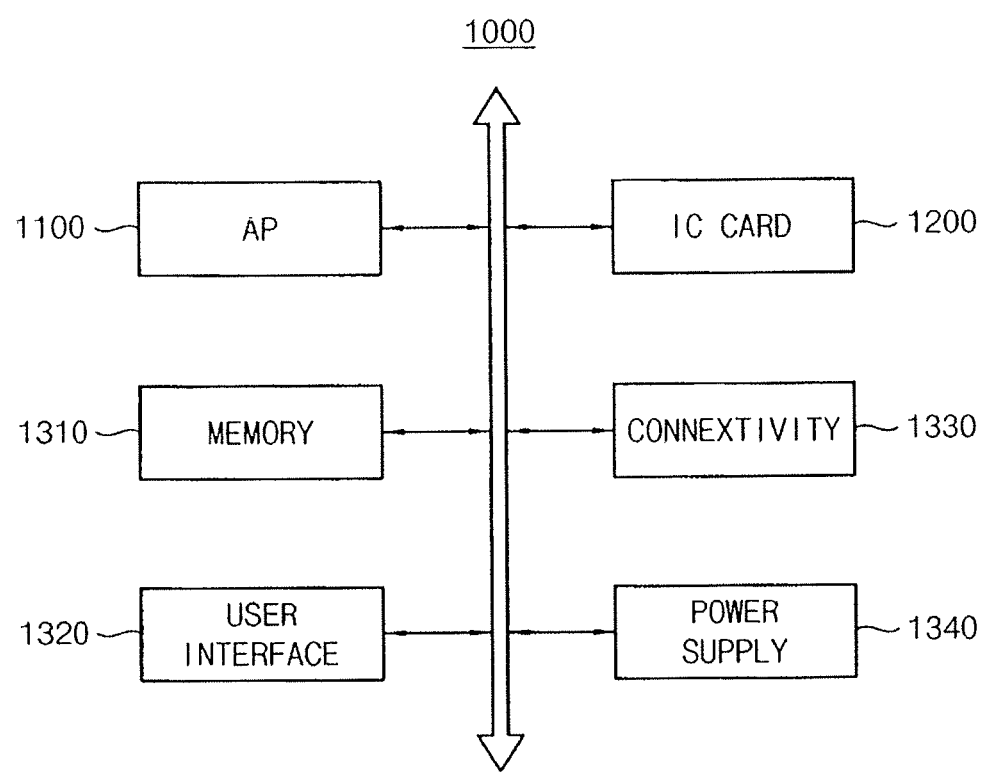
FIG. 27 is a block diagram illustrating a mobile system according to an exemplary embodiment.

FIG. 27 is a block diagram illustrating a mobile system according to an exemplary embodiment.

Referring to FIG. 16, a mobile system 1000 includes an application processor 1100, a contactless smart card such as an IC card 1200, a memory 1310, a user interface 1320, a connectivity unit 1330, and a power supply 1340. According to at least one exemplary embodiment, the mobile system 1000 may be any mobile system, such as a mobile phone, a smart phone, a personal digital assistant (PDA), a portable multimedia player (PMP), a digital camera, a portable game console, a music player, a camcorder, a video player, a navigation system, etc.

The application processor 1100 may execute applications, such as a web browser, a game application, a video player, etc. In at least one exemplary embodiment, the application processor 1100 may include a single core or multiple cores. For example, the application processor 1100 may be a multi-core processor, such as a dual-core processor, a quad-core processor, a hexa-core processor, etc. According to at least one example, the application processor 1110 may be coupled to an internal/external cache memory.

The memory device 1310 may store a boot image for booting the mobile system 1000, output data to be transmitted to an external device, and input data from the external device. For example, the memory device 1310 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The contactless smart card 1200 selects the reference voltage for the regulator in the internal voltage generator according to operation mode that is determined based on whether the internal circuit performs an encryption operation. Thus, a fluctuation component is inhibited (or alternatively, prevented) from being transferred to the input voltage. Therefore, the contactless smart card 1200 may reduce (or alternatively) prevent transmission errors that may occur when the internal circuit performs encryption operation.

The user interface 1320 may include at least one input device, such as a keypad, a touch screen, etc., and at least one output device, such as a speaker, a display device, etc. The power supply 1340 may supply a power supply voltage to the mobile system 1000.

The connectivity unit 1330 may perform wired or wireless communication with an external device. For example, the connectivity unit 1330 may perform Ethernet communication, near field communication (NFC), radio frequency identification (RFID) communication, mobile telecommunication, memory card communication, universal serial bus (USB) communication, etc. In at least one exemplary embodiment, connectivity unit 1330 may include a baseband chipset that supports communications, such as global system for mobile communications (GSM), general packet radio service (GPRS), wideband code division multiple access (WCDMA), high speed downlink/uplink packet access (HSxPA), etc.

In at least one exemplary embodiment, the mobile system 1000 may further include a camera image processor (CIS), and/or a storage device, such as a memory card, a solid state drive (SSD), a hard disk drive (HDD), a CD-ROM, etc.

In at least one exemplary embodiment, the mobile system 1000 and/or components of the mobile system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

Various exemplary embodiments may be widely applicable to various contactless smart cards, such as IC cards, and card systems. If the reader receiver according to exemplary embodiments is implemented, the design size and the power consumption of the communication system including the reader receiver may be decreased.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of inventive concepts. Accordingly, all such modifications are intended to be included within the scope of inventive concepts as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

The invention claimed is:

1. A device comprising:
   a sub-circuit to receive at least one stop voltage as a power supply voltage;
   a frequency detector to detect whether an external clock signal is activated or deactivated in an idle mode of the device and to generate a control signal indicating a clock stop time interval in the idle mode of the device during which the external clock signal is deactivated; and
   at least one stop voltage controller to provide the at least one stop voltage to the sub-circuit and to reduce a level of the at least one stop voltage during the clock stop time interval based on the control signal such that the sub-circuit operates with lower power consumption during the clock stop time interval than during another time interval in the idle mode of the device, wherein:
   the external clock signal is deactivated during the clock stop time interval in the idle mode of the device, and
   the external clock signal is activated during the another time interval in the idle mode of the device, and wherein:
   the power supply voltage of the sub-circuit is maintained at a first voltage level for first clock cycles of the external clock signal in the clock stop time interval in the idle mode of the device, the power supply voltage is maintained at a second voltage level for second clock cycles of the external clock signal in the another time interval in the idle mode of the device, and the first voltage level of the power supply voltage is lower than the second voltage level of the power supply voltage.

2. The device of claim 1, further comprising a plurality of active voltage controllers to provide a plurality of active voltages, the plurality of active voltage controllers being activated and deactivated based on a plurality of active voltage controller enable signals.

3. The device of claim 2, wherein the plurality of active voltage controllers are sequentially turned-off during a first idle time interval before the clock stop time interval.

4. The device of claim 2, wherein the plurality of active voltage controllers are sequentially turned-on during a second idle time interval after the clock stop time interval.

5. The device of claim 2, wherein, during the clock stop time interval, the plurality of active voltage controllers are deactivated and the at least one stop voltage controller is activated.

6. The device of claim 1, further comprising a plurality of oscillators to provide a plurality of oscillator signals, the plurality of oscillators being activated and deactivated based on a plurality of oscillator enable signals.

7. The device of claim 6, wherein the plurality of oscillators are sequentially turned-off during a first idle time interval before the clock stop time interval.

8. The device of claim 6, wherein the plurality of oscillators are sequentially turned-on during a second idle time interval after the clock stop time interval.

9. The device of claim 1, further comprising a plurality of detectors to detect internal environment of the device including temperature, the plurality of detectors being activated and deactivated based on a plurality of detector enable signals.

10. The device of claim 9, wherein the plurality of detectors are sequentially turned-off during a first idle time interval before the clock stop time interval, and
wherein the plurality of detectors are sequentially turned-on during a second idle time interval after the clock stop time interval.

11. The device of claim 1, further comprising a reset circuit to reset the device when an internal voltage of the device is less than a predetermined voltage,
wherein, during the clock stop time interval, the reset circuit is turned-off based on a reset enable signal.

12. The device of claim 1, further comprising:
a clock pad to receive the external clock signal from an external device; and
an input-output pad to receive an input-output signal from the external device,
wherein, during the clock stop time interval, the clock pad is turned-on and the input-output pad is turned-off based on a pad enable signal.

13. The device of claim 1, wherein the at least one stop voltage controller are a plurality of stop voltage controllers, the plurality of stop voltage controllers including:
a first stop voltage controller to provide a first stop voltage; and
a second stop voltage controller to provide a second stop voltage,
wherein, during the clock stop time interval, a level of the first stop voltage is different from a level of the second stop voltage.

14. The device of claim 13, further comprising:
a logic circuit to operate based on the first stop voltage during the clock stop time interval; and
a static random access memory (SRAM) to operate based on the second stop voltage during the clock stop time interval.

15. The device of claim 1, wherein the device corresponds to a smart card that receives the external clock signal from a card reader.

16. A system comprising:
a card reader to provide a clock signal; and
a smart card including:
a sub-circuit to receive at least one stop voltage as a power supply voltage;
a frequency detector to detect whether the clock signal from the card reader is activated or deactivated in an idle mode of the smart card and to generate a control signal indicating a clock stop time interval during which the clock signal is deactivated; and
at least one stop voltage controller to provide the at least one stop voltage to the sub-circuit and to reduce a level of the at least one stop voltage during the clock stop time interval based on the control signal such that the sub-circuit operates with lower power consumption during the clock stop time interval than during another time interval in the idle mode of the smart card,
wherein:
the clock signal is deactivated during the clock stop time interval in the idle mode of the smart card, and
the clock signal is activated during the another time interval in the idle mode of the smart card, and wherein:
the power supply voltage of the sub-circuit is maintained at a first voltage level for first clock cycles of the clock signal in the clock stop time interval in the idle mode of the smart card,
the power supply voltage is maintained at a second voltage level for second clock cycles of the clock signal in the another time interval in the idle mode of the smart card, and
the first voltage level of the power supply voltage is lower than the second voltage level of the power supply voltage.

17. The system of claim 16, wherein the card reader activates the clock signal during a first idle time interval after a first data transmission and before the clock stop time interval, and activates the clock signal during a second idle time interval after the clock stop time interval and before a second data transmission.

18. The system of claim 17, wherein the smart card further includes a plurality of active voltage controllers that are sequentially turned-off during the first idle time interval and sequentially turned-on during the second idle time interval based on a plurality of active voltage controller enable signals.

19. The system of claim 17, wherein the smart card further includes a plurality of oscillators that are sequentially turned-off during the first idle time interval and sequentially turned-on during the second idle time interval based on a plurality of oscillator enable signals.

20. A method of operating a smart card, the method comprising:
providing a clock signal from a card reader to a smart card;
detecting, by a frequency detector, whether the clock signal from the card reader is activated or deactivated in an idle mode of the smart card and to generate a control signal indicating a clock stop time interval during which the clock signal is deactivated; and providing at least one stop voltage as a power supply voltage to a sub-circuit, and reducing a level of the at least one stop voltage during the clock stop time interval based on the control signal such that the sub-circuit operates with lower power consumption during the clock stop time interval than during another time interval in the idle mode of the smart card, wherein:

the clock signal is deactivated during the clock stop time interval in the idle mode of the smart card, and the clock signal is activated during the another time interval in the idle mode of the smart card, and wherein:

the power supply voltage of the sub-circuit is maintained at a first voltage level for first clock cycles of the clock signal in the clock stop time interval in the idle mode of the smart card, the power supply voltage is maintained at a second voltage level for second clock cycles of the clock signal in the another time interval in the idle mode of the smart card, and the first voltage level of the power supply voltage is lower than the second voltage level of the power supply voltage.

\* \* \* \* \*